United States Patent
Gumaste

(10) Patent No.: US 7,801,034 B2
(45) Date of Patent: Sep. 21, 2010

(54) SYSTEM AND METHOD FOR BANDWIDTH ALLOCATION IN AN OPTICAL LIGHT-TRAIL

(75) Inventor: Ashwin A. Gumaste, Dallas, TX (US)

(73) Assignee: Fujitsu Limited, Kawasaki (JP)

( * ) Notice: Subject to any disclaimer, the term of this patent is extended or adjusted under 35 U.S.C. 154(b) by 1132 days.

(21) Appl. No.: 11/380,812

(22) Filed: Apr. 28, 2006

(65) Prior Publication Data
US 2007/0255640 A1 Nov. 1, 2007

(51) Int. Cl.
*G06F 11/00* (2006.01)
(52) U.S. Cl. ...................................... 370/230
(58) Field of Classification Search ................ 370/230, 370/230.1, 229
See application file for complete search history.

(56) References Cited

U.S. PATENT DOCUMENTS

| | | | |
|---|---|---|---|
| 4,651,316 A | 3/1987 | Kocan et al. ............. | 370/462 |
| 5,258,978 A | 11/1993 | Cloonan et al. ........... | 370/411 |
| 5,469,428 A | 11/1995 | Tokura et al. | |
| 5,724,166 A | 3/1998 | Nakata | |
| 5,854,700 A | 12/1998 | Ota | |
| 5,903,371 A | 5/1999 | Arecco et al. | |
| 6,160,648 A | 12/2000 | Oberg et al. | |
| 6,169,746 B1 | 1/2001 | Ueda et al. .............. | 370/466 |
| 6,195,186 B1 | 2/2001 | Asahi | |
| 6,504,849 B1 | 1/2003 | Wang et al. .............. | 370/455 |
| 6,567,194 B1 | 5/2003 | Badr ....................... | 398/1 |
| 6,594,232 B1 | 7/2003 | Dupont | |
| 6,631,134 B1 | 10/2003 | Zadikian et al. | |
| 6,701,085 B1 | 3/2004 | Muller | |
| 6,728,484 B1 | 4/2004 | Ghani ..................... | 398/42 |
| 6,766,113 B1 | 7/2004 | Al-Salameh et al. | |
| 6,775,477 B2 | 8/2004 | Badr ....................... | 398/1 |
| 6,795,394 B1 | 9/2004 | Swinkels et al. | |
| 6,850,711 B2 | 2/2005 | Tsuruta ................... | 398/168 |
| 6,882,799 B1 | 4/2005 | Beshai et al. | |

(Continued)

FOREIGN PATENT DOCUMENTS

WO      WO 03/104849 A2    12/2003

OTHER PUBLICATIONS

Dutton et al., "Understanding Optical Communications," IBM International Technical Support Organization, Sep. 1998, p. 9, 366, and 367 (3 pages), Sep. 1998.

(Continued)

*Primary Examiner*—Derrick W Ferris
*Assistant Examiner*—Mohammad Anwar
(74) *Attorney, Agent, or Firm*—Baker Botts L.L.P.

(57) ABSTRACT

A method for allocating the use of an optical light-trail includes calculating a bid at a first node in the light-trail with consideration for the criticality of the node's need to transmit particular traffic on the light-trail. The method also includes transmitting the calculated bid to one or more of the other nodes included in the light-trail. In addition, the method includes receiving an acknowledgment from one or more of the other nodes included in the light-trail, each acknowledgement indicating whether the transmitted bid is higher or lower than a bid calculated by the node from which the acknowledgment originates. The method also includes determining, based at least on the content of acknowledgements received, whether the transmitted bid is the highest bid.

24 Claims, 6 Drawing Sheets

U.S. PATENT DOCUMENTS

| | | | |
|---|---|---|---|
| 6,889,007 B1 | 5/2005 | Wang et al. | 398/79 |
| 7,016,363 B1* | 3/2006 | Reed et al. | 370/404 |
| 7,023,796 B2 | 4/2006 | De Girolamo et al. | |
| 7,031,299 B2 | 4/2006 | Chaudhuri et al. | |
| 7,088,920 B2 | 8/2006 | Krishnaswamy et al. | |
| 7,184,663 B2 | 2/2007 | Kinoshita et al. | |
| 7,218,854 B1 | 5/2007 | Unitt et al. | |
| 7,266,296 B2 | 9/2007 | Ovadia et al. | |
| 7,308,198 B1 | 12/2007 | Chudak et al. | |
| 2002/0114030 A1 | 8/2002 | Dwivedi et al. | |
| 2003/0189920 A1 | 10/2003 | Erami et al. | |
| 2003/0206521 A1* | 11/2003 | Qiao | 370/230 |
| 2003/0223104 A1 | 12/2003 | Kinoshita et al. | |
| 2003/0223682 A1 | 12/2003 | Kinoshita et al. | |
| 2003/0235153 A1 | 12/2003 | Lee et al. | |
| 2004/0034753 A1 | 2/2004 | Jeddeloh | |
| 2004/0052530 A1 | 3/2004 | Tian et al. | |
| 2004/0120261 A1* | 6/2004 | Ovadia et al. | 370/252 |
| 2004/0234263 A1 | 11/2004 | Ovadia et al. | |
| 2004/0252995 A1 | 12/2004 | Ovadia et al. | |
| 2005/0013613 A1 | 1/2005 | Stevenson et al. | |
| 2005/0088964 A1 | 4/2005 | Yang et al. | |
| 2005/0191054 A1 | 9/2005 | Aoki et al. | |
| 2006/0013584 A1 | 1/2006 | Miyazaki | |
| 2006/0056279 A1 | 3/2006 | Pronk et al. | |
| 2006/0188258 A1 | 8/2006 | Gumaste et al. | |
| 2006/0210268 A1 | 9/2006 | Gumaste et al. | |
| 2006/0210273 A1 | 9/2006 | Gumaste et al. | |
| 2006/0222360 A1 | 10/2006 | Gumaste et al. | |
| 2006/0228112 A1 | 10/2006 | Gumaste et al. | |
| 2006/0245755 A1 | 11/2006 | Gumaste et al. | |
| 2007/0019662 A1 | 1/2007 | Gumaste et al. | |
| 2007/0047958 A1 | 3/2007 | Gumaste et al. | |
| 2007/0121507 A1 | 5/2007 | Manzalini et al. | |
| 2007/0255640 A1 | 11/2007 | Gumaste et al. | |

OTHER PUBLICATIONS

Ramaswami et al., "Optical Networks: A Practical Perspective," First Edition, Morgan Kauffman Publications, 1998, pp. 423-462 (41 total pages), 1998.

Maille et al., "Multi-Bid Auctions for Bandwidth Allocation in Communications Networks," INFOCOM 2004, Mar. 7-11, 2004, vol. 4, pp. 54-65.

Chiang et al., "Balancing Supply and Demand of Bandwidth in Wireless Cellular: Networks: Utility Maximization Over Powers and Rates," INFOCOM 2004, Mar. 7-11, 2004, vol. 4, pp. 2800-2811.

Banaerjee et al., "Generalized Multiprotocol Label Switching: An Overview of Routing and Management Enhancements," IEEE Communications Magazine, Jan. 2001, pp. 144-149.

Bertsekas, Dimitri, "The Auction Algorithm: A Distributed Relaxation Method for the Assignment Problem," Report LIDS-P-1653, Mar. 1987, Revised Sep. 1987, pp. 1-27.

Chlamtac et al., "Bandwidth Management in Community Networks," Center for Advance Telecommunications Systems and Services, pp. 1-11, 2002, IWDC, LNCS 2571.

Chlamtac et al., Lightpath Communications: An Approach to High Bandwidth Optical WAN's, IEEE Transactions on Communications, vol. 40, No. 7, Jul. 1992, pp. 1171-1182.

Chlamtac et al., "Light-Trails: A Solution to IP Centric Communication in the Optical Domain," 11 pages, Center for Advance Technology Systems and Services, University of Texas at Dallas, Texas 75083, USA, Quality of Service in Multiservice IP Networks, Second International Workshop, QoS-IP 2003, Feb. 2003.

Dolzer et al., "Evaluation of Reservation Mechanisms for Optical Burst Switching," 8 pages, 2001, AEU Int. J. Electron. Commun. 55 No. 1, 1-1, 2001.

Fang et al., "Optimal Light Trail Design in WDM Optical Networks," IEEE Communications Society, 2004 IEEE, pp. 1699-1703, 2004.

Foster, "The Grid Blue Print for a New Computing Infrastructure," Morgan Kauffman, Nov. 1998, pp. 479-532.

Frederick et al., "Light Trails: A Sub-Wavelength Solution for Optical Networking," 2004 IEEE, 2004 Workshop on High Performance Switching and Routing, Apr. 19-21, 2004.

Fumagalli et al., "The Multi-Token Inter-Arrival Time (MTIT) Access Protocol for Supporting IP over WDM Ring Network," 1999 IEEE, pp. 586-590, 1999.

Ghani et al., "On IP-Over-WDM Integration," IEEE Communications Magazine, Mar. 2000, pp. 72-84, WDM Optical Networks: A Reality Check.

Gumaste et al., "A Scheduling Procedure for Control Signaling in Optical Burst Switched Network," in Proceedings for the First International Conference on Optical Communications and NetWorks, Nov. 11-14 2002, pp. 190-193.

Gumaste et al., Bifurcated Traffic and Channel Assignment (BITCA) to Interconnected Metro Rings, 3 pages, OFC 2002.

Gumaste et al., "Light-Frames: A Pragmatic Framework for Optical Packet Transport," IEEE Communications Society, pp. 1537-1542, 2004.

Gumaste et al., "Light-Trail and Light-Frame Architectures for Optical Networks," PHD Thesis, University of Texas Dallas, Dec. 2003.

Gumaste et al., "Light-Trails: A Novel Conceptual Framework for Conducting Optical Communications," Center for Advanced Telecommunications Services and Studies, 7 pages, 2003.

Gumaste et al., Light Trails: An Optical Solution for IP Transport, J. Opt. Net., vol. 3, 2004, pp. 261-281, Center for Advanced Telecommunications Systems and Services, The University of Texas at Dallas, May 2004, vol. 3, No. 5, Journal of Optical Networking, pp. 261-281, May 2004.

Gumaste et al., "Heuristic and Optimal Techniques for Light-Trail Assignment in Optical WDM Networks," Photonics Networking Laboratory, 7 pages, unknown date.

Gumaste et al., Mesh Implementation of Light Trails: A Solution to IP Centric Communication, 6 pages, Center for Advanced Telecommunications Services and Studies, unknown date.

Gumaste et al., "Next-Generation Optical Storage Area Networks: The Light-Trails Approach," Optical Storage Area Networks, IEEE Communications Magazine, Mar. 2005, pp. 72-79.

Gumaste et al., "Optimizing Light-Trail Assignment to WDM Networks for Dynammic IP Centric Traffic," pp. 113-118, unknown.

Gumaste et al. Performance Evaluation and Demonstration of Light Trails in Shared Wavelength Optical Networks (SWONSs), 2 pages, date unknown.

Gumaste et al., "Providing Bandwidth on Demand to End-Users by Adaptations to a GMPLS Framework: The Light-Trails Approach," National Fiber Optics Engineers Conference, 2003 Technical Proceedings, pp. 1137-1141.

Gumaste et al., "Optical Implementation of Resilient Packet Rings Using Light-Trails," Advanced Computer Network and Architecture Laboratory, 7 pages, unknown.

Humblet, "Models of Blocking Probability in All-Optical Networks With and Without Wavelength Changers," IEEE on Selected Areas in Communications, Jun. 1996, vol. 14, No. 5, ISACEM, 11 pages.

Kinoshita, S.. "Broadband Fiber Optic Amplifiers," OFC 2001, Optical Fiber Communications Conference and Exhibit, Mar. 17-22, 2001, 5 pages.

Ota et al., "High-Speed, Burst-Mode, Packet-Capable Optical Receiver and Instantaneous Clock Recovery for Optical Bus Operation," Journal of Lightwave Technology, vol. 12, No. 2, Feb. 1994, pp. 325-331.

Qiao et al., "On an IP-Centric Optical Control Plane" Intelligence in Optical Networks, IEEE Communication Magazine, Sep. 2001, pp. 88-93.

Ramaswami et al., "Routing and Wavelengths Assignment in All-Optical Networks," IEEE/ACM Transactions on Networking, Oct. 1995, vol. 5, No. 3, pp. 489-500.

Resilient Packet Ring Alliance, "An Introduction to Resilient Packet Ring Technology," A White Paper by the Resilient Packet Ring Alliance, Oct. 2001, pp. 1-16.

Sahasrabuddhe et al., "Fault Management in IP-Over-WDM Networks: WDM Protection versus IP Restoration," IEEE Journal on Selected Areas in Communications, vol. 20, No. 1, Jan. 2002, pp. 21-33.

Sasaki et al., "The Interface Between IP and WDM and Its Effect on the Cost of Survivability," IEEE Commununications Magazine, Jan. 2003, World Telecommunications Congress 2002 (WTC 2002), pp. 74-79.

Shrinkhande et al., "CSMA/CA MAC Protocols for IP HORNET: An IP HORNET: An IP Over WDM Metropolitan Area Ring Network," Stanford University Optical Communications Research Laboratory, 5 pages, 2000.

Spadaro et al., "Positioning of the RPR Standard in Contemporary Operator Environments," 10 pages, unknown.

Tancevski et al., "Optical Routing as Asynchronous, Variable Length Packets," IEEE Journal on Selected Areas in Communications, vol. 18, No. 10, Oct. 2000, pp. 2084-2093.

Verma et al., "Optical Burst Switching: A Viable Solution for Terabit IP Backbone," IEEE Network Magazine, vol. 14, No. 6, Nov./Dec. 2000, pp. 48-53.

Yoo et al., "Just Enough Time (JET): A High Speed Protocol for Bursty Traffic in Optical Networks,:" Proc. IEE/LEOS Tech. G11, Aug. 1997, pp. 26-27.

Yener et al., "Flow Trees: A Lower Bound Computation Tool for Network Optimization," Columbia Tool for Network Optimization, Columbia Univ. Tech. Rep. CUCS-006-94, unknown.

Zhang et al., "Differentiated Multi Layer Survivability in IP/WDM Networks," in Network Operations and Management Symposium, IEEE, New York, 2002, pp. 681-696.

Zhang et al., "A Heuristic Wavelength Assignment Algorithm for Multihop WDM Networks with Wavelength Routing and Wavelength Reuse," in Proc. INFOCOM 94, 1994, pp. 534-543.

Gumaste, "Method and System for Time Sharing Transmission Frequencies in an Optical Network," U.S. Appl. No. 11/061,255, filed Feb. 18, 2005.

Gumaste, "System and Method for Implementing Optical Light-Trails," U.S. Appl. No. 11/080,051, filed Mar. 15, 2005.

Gumaste, "System and Method for Implementing Optical Light-Trails," U.S. Appl. No. 11/080,752, filed Mar. 15, 2005.

Gumaste, "System and Method for Bandwidth Allocation in an Optical Light-Trail," U.S. Appl. No. 11/218,262, filed Aug. 13, 2005.

Gumaste, "System and Method for Transmission and Reception of Traffic in Optical Light-Trails," U.S. Appl. No. 11/095,246, filed Mar. 30, 2005.

Gumaste, "System and Method for Protecting Optical Light-Trails," U.S. Appl. No. 11/098,720, filed Apr. 4, 2005.

Gumaste, "System and Method for Shaping Traffic in Optical Light-Trails," U.S. Appl. No. 11/118,899, filed Apr. 29, 2005.

Gumaste, "Heuristical Assignment of Light-Trails in a Optical Netowrk," U.S. Appl. No. 11/185,958, filed Jul. 19, 2005.

* cited by examiner

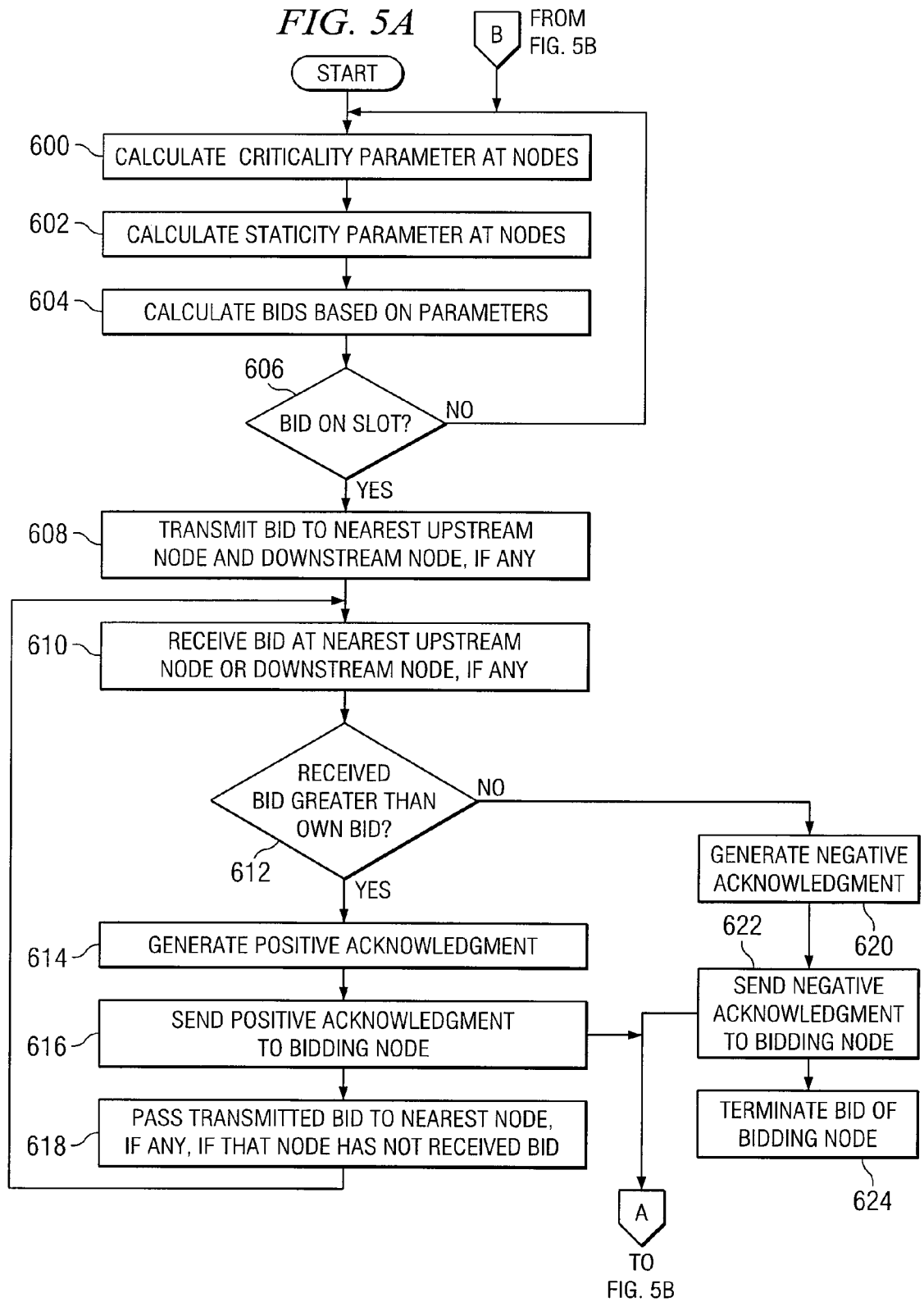

US 7,801,034 B2

SYSTEM AND METHOD FOR BANDWIDTH ALLOCATION IN AN OPTICAL LIGHT-TRAIL

TECHNICAL FIELD

The present invention relates generally to optical networks and, more particularly, to a system and method for bandwidth allocation in an optical light-trail established in an optical communication network.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

Recent years have seen an explosion in the use of telecommunication services. As the demand for telecommunication services continues to grow, optical networks are quickly becoming overburdened by the increasing amount of information communicated over such networks. The addition of new networks or the expansion of existing networks may however be too costly to be practical solutions to this problem. Thus, efficient use of network resources has become an important goal in developing and operating optical networks.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. By using WDM add/drop equipment at network nodes, the entire composite signal can be fully demultiplexed into its constituent channels and switched (added/dropped or passed through). In such networks, traffic from one network node to another network node is often assigned to a particular wavelength on which the traffic is communicated over the network. By assigning different traffic streams to different wavelengths, interference between different traffic streams is prevented. However, in certain situations, this creates inefficiency in the network. For example, if the traffic from a node that is assigned a particular wavelength does not typically use much of the bandwidth (capacity) associated with the wavelength, then inefficiencies are created.

SUMMARY

The present invention relates to bandwidth allocation in an optical light-trail. Optical light-trails enable a plurality of nodes included in a light-trail to share the use of an optical wavelength to transmit traffic between the nodes included in the light-trail. In accordance with a particular embodiment of the present invention, a method for allocating the use of an optical light-trail includes calculating a bid at a first node in the light-trail with consideration for the criticality of the node's need to transmit particular traffic on the light-trail. The method also includes transmitting the calculated bid to one or more of the other nodes included in the light-trail. In addition, the method includes receiving an acknowledgment from one or more of the other nodes included in the light-trail, each acknowledgement indicating whether the transmitted bid is higher or lower than a bid calculated by the node from which the acknowledgment originates. The method also includes determining, based at least on the content of acknowledgements received, whether the transmitted bid is the highest bid.

Technical advantages of certain embodiments of the present invention may include efficient techniques for using transmission resources on optical networks. More specifically, in particular embodiments of the present invention, nodes of an optical network are capable of establishing an optical "light-trail" that includes one or more other nodes for the transmission of optical traffic. Such a light-trail may be shared by the nodes included in the light-trail to transmit traffic to other nodes included in the light-trail. The use of such light-trails may result in more efficient communication of information in the optical network since a number of nodes can share the bandwidth provided by a wavelength at which the light-trail is established.

In order for nodes to share a light-trail, a number of different techniques may be used to allocate use of the light-trail for a particular amount of time to a particular node in the light-trail. Embodiments of the present invention use an "auction" algorithm that allows various nodes to submit bids for use of the light-trail and for a decision to be made regarding allocation of the light-trail based on these bids. This technique is an efficient and fair way to allocate the use of the light-trail amongst the nodes in the light-trail.

Another technical advantage of certain embodiments of the present invention may include utilizing distributed arbitration regarding allocation of the light-trail, thereby avoiding problems associated with having a single point of failure for the entire system. Specifically, in particular embodiments, by not having only a single arbiter node deciding the allocation of the light-trail amongst all of the nodes, the system is more robust and less susceptible to failure.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

FIGS. 5A and 5B are flowcharts illustrating another example auction technique for sharing the use of a light-trail established in the optical network in accordance with one embodiment of the present invention.

DETAILED DESCRIPTION OF THE DRAWINGS

Figure 1:
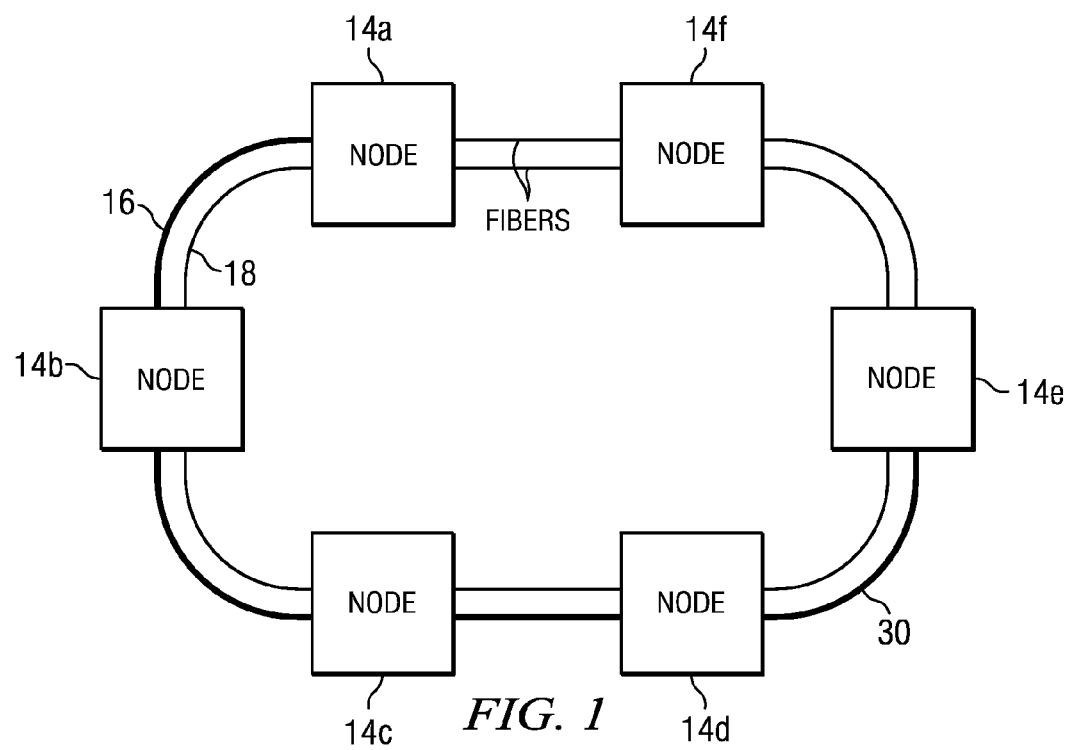
FIG. 1 is a block diagram illustrating an optical ring network in which light-trails may be implemented in accordance with one embodiment of the present invention.

FIG. 1 illustrates an optical network 10 in accordance with one embodiment of the present invention. Optical network 10 includes a plurality of nodes 14 coupled to an optical ring 20. During operation, nodes 14 transmit and receive traffic on optical ring 20 on one of a plurality of wavelengths. In particular, a light-trail, such as light-trail 30 in FIG. 1, may be established over which nodes 14 may transmit optical traffic to other nodes 14 located on that light-trail. Nodes included in a light-trail share the light-trail, as appropriate, to transmit information to other nodes included in the light-trail on a wavelength associated with the light-trail. Thus, a light-trail is a generalization of a light path (an optical wavelength circuit) such that multiple nodes along the path can take part in communication along the path. Therefore, the use of these light-trails addresses the inefficiency discussed above associated with assigning a wavelength for traffic communicated from a single node to another node. In addition, light-trail communications allow optical multicasting and dynamic provisioning.

Figure 2:
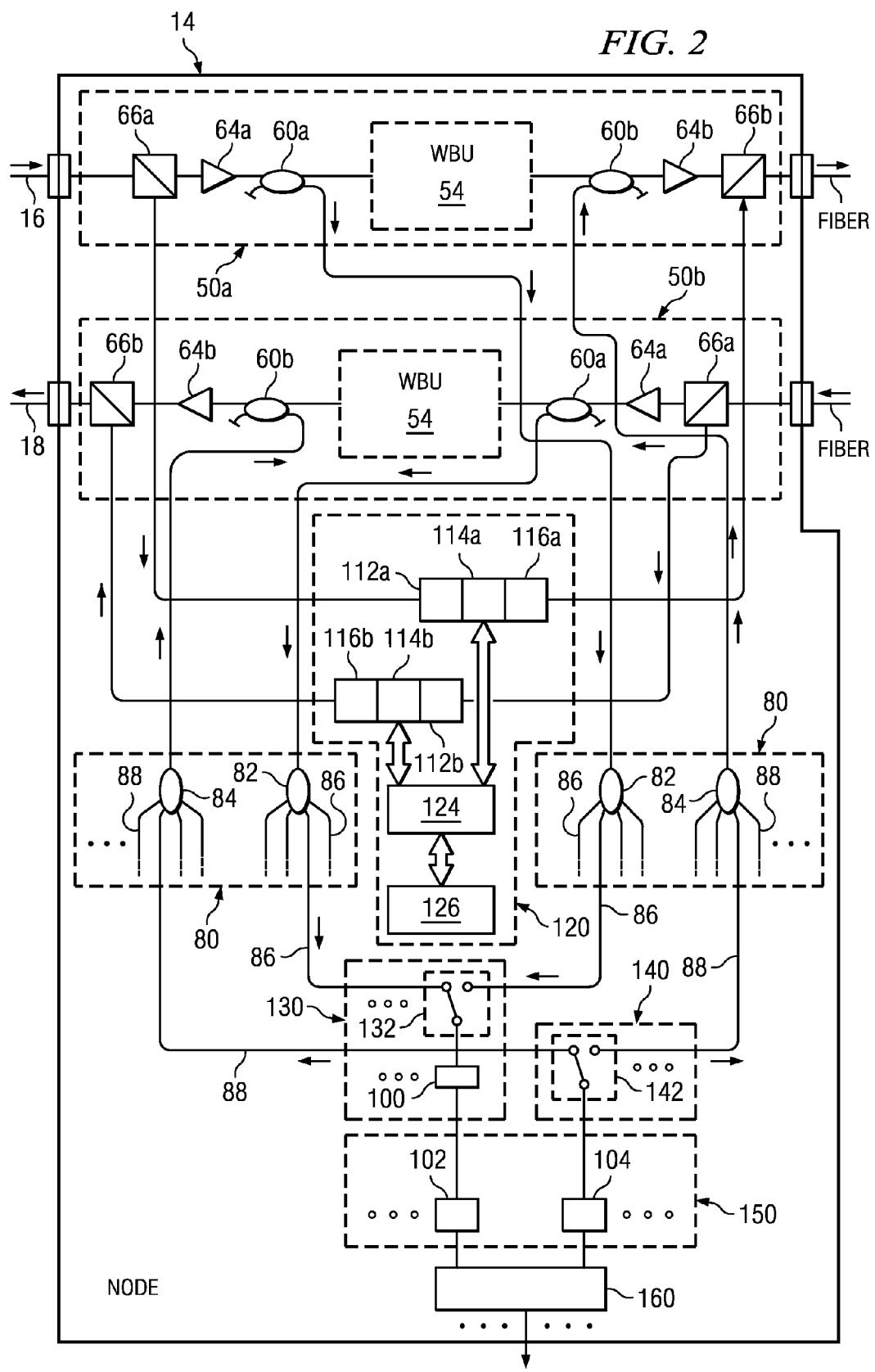
FIG. 2 is a block diagram illustrating a particular embodiment of a node that may be utilized in an optical network implementing light-trails.

Nodes 14 that allow light-trail communication have specific characteristics that enable the nodes 14 to implement light-trails. For example, these characteristics include a drop and continue function (where traffic received by an element of the node is both dropped and forwarded, so as to allow the traffic to continue along the light-trail), passive adding of traffic by the node ("passive" in this context means the adding of traffic without using optical switches that use power, electricity, and/or moving parts), and the use of an out-of-band control channel (as opposed to control signals that are in-band with the data being communicated on the network 10). As described below, FIG. 2 illustrates a particular embodiment of a node 14 including these characteristics.

Referring again to FIG. 1, although a single light-trail 30 is illustrated, nodes 14 may establish light-trails on one or more wavelengths utilized by optical network 10 and multiple non-overlapping light-trails may exist at a particular time on a particular wavelength. To prevent optical interference caused by multiple nodes 14 transmitting simultaneously on a particular light-trail in optical network 10, nodes 14 may utilize particular techniques for sharing the light-trail, as described below. Therefore, there are two levels of "arbitration" associated with light-trails. The first level is the establishment and termination of light-trails to meet particular demands, as well as the "dimensioning" of light-trails (growing or shrinking the trails to meet particular demands). The second level of arbitration is the allocation of the use of the light-trail to nodes in the light-trail. Nodes may be allocated bandwidth according to defined rules or heuristics, predefined bandwidth allocation algorithms, "round robin" techniques (as discussed below), on a dynamic basis, and/or using any other suitable techniques.

Although FIG. 1 illustrates a particular embodiment and configuration of ring network 10, mesh, linear, or other suitable types of optical networks may be used in accordance with the present invention. In the illustrated embodiment, network 10 is an optical network in which a number of optical channels are carried over a common transmission media at different wavelengths. For example, network 10 may be a wavelength division multiplexed (WDM) network, a dense wavelength division multiplexed (DWDM) network, or any other suitable multi-channel network. Network 10 may represent all or a portion of a short-haul metropolitan network, a long-haul intercity network, or any other suitable network or combination of networks. Network 10 may include, as appropriate, a single unidirectional fiber, a single bi-directional fiber, or a plurality of uni- or bi-directional fibers.

Optical ring 20, in the illustrated embodiment, comprises a pair of uni-directional fibers, first fiber 16 and second fiber 18, transporting traffic in a counterclockwise and clockwise direction, respectively. Optical ring 20 optically couples the plurality of nodes 14a-14f, and optical traffic propagates between nodes 14 over optical ring 20. As used herein, "traffic" means information transmitted, stored, or sorted in the network. Such traffic may comprise optical signals having at least one characteristic modulated to encode audio, video, textual, real-time, non-real-time and/or other suitable data. Modulation may be based on phase shift keying (PSK), intensity modulation (IM), and other suitable methodologies. Additionally, the information carried by this traffic may be structured in any suitable manner. Although the description below focuses on an embodiment of network 10 that communicates traffic on optical ring 20 in the form of optical frames, network 10 may be configured to communicate traffic structured in the form of frames, as packets, or in any other appropriate manner.

Using established light-trails, nodes 14 facilitate communication between a plurality of client devices (not shown) coupled to each node 14 through a plurality of client ports. As described in greater detail below, each node 14 may receive traffic from client devices coupled to that node 14 and add this traffic to optical ring 20 to the optical traffic propagating on optical ring 20. Each node 14 may also receive traffic from optical ring 20 and drop traffic destined for client devices of that node 14, such as personal computers (PCs), telephones, fax machines, hard drives, web servers, and/or any other appropriate communication device. Although FIG. 1, illustrates one embodiment of network 10 that includes a particular number of nodes 14, network 10 may include any appropriate number of nodes 14 configured in any appropriate manner.

In operation, nodes 14 generate optical traffic at one or more wavelengths based on electrical signals received by nodes 14 from client devices coupled to nodes 14 and add this optical traffic to optical traffic propagating on optical ring 20. Nodes 14 also receive and drop traffic propagating on optical ring 20 that is destined for one or more of its clients. For the purposes of this description, nodes 14 may "drop" traffic by transmitting a copy of the traffic to any appropriate components that are a part of or coupled to the relevant node 14. As a result, nodes 14 may drop traffic from optical ring 20 by transmitting the traffic to these components while allowing the traffic to continue to downstream components on optical ring 20. Each node 14 drops and electrically converts traffic received on particular wavelengths at which that node 14 is configured to receive traffic and either does not drop or discards traffic transmitted at other wavelengths. Once traffic is dropped from the optical ring 20, nodes 14 may provide optical-to-electrical conversion of the dropped traffic. Nodes 14 then extract, based on addressing information in the traffic, portions of this traffic destined for client devices coupled to that node 14. In certain embodiments, each node 14 includes, or has associated with it, a switching element which may forward the traffic, or a portion thereof, to one or more of a plurality of client devices based on addressing information.

Since nodes 14 time-share a wavelength associated with a particular light-trail, the data flow patterns through a light-trail dominant network may be somewhat "bursty" in nature due to the interleaving of data streams from multiple nodes 14. However, client devices (typically, Layer-2 devices) associated with a node 14 expect that the optical layer will provide uninterrupted communication to the devices. Therefore, to facilitate an interface between the bursty optical layer (due to time sharing of the bandwidth of light-trails) and the continuous client layer, nodes 14 include a device called a burstponder. A burstponder is a device that allows a node 14 to time share a wavelength while creating an impression to client device of the node 14 that the wavelength is available on a seamless and continuous basis. Such a burstponder is described in further detail in conjunction with FIG. 2.

Figure 3A:
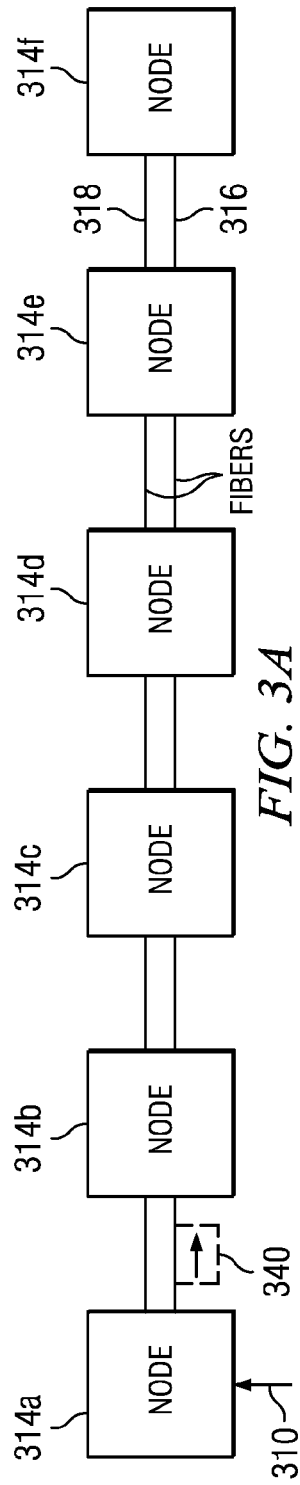
FIGS. 3A-3C illustrate example operation of nodes of an optical network in establishing a light-trail.
Figure 3B:
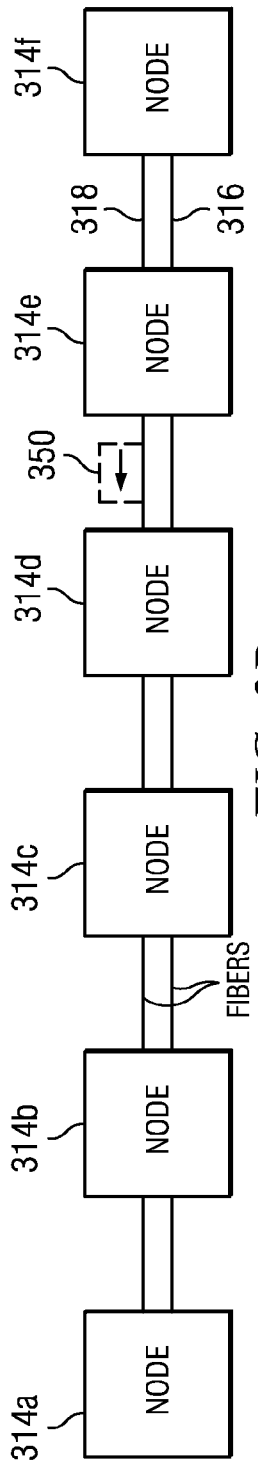
Figure 3C:
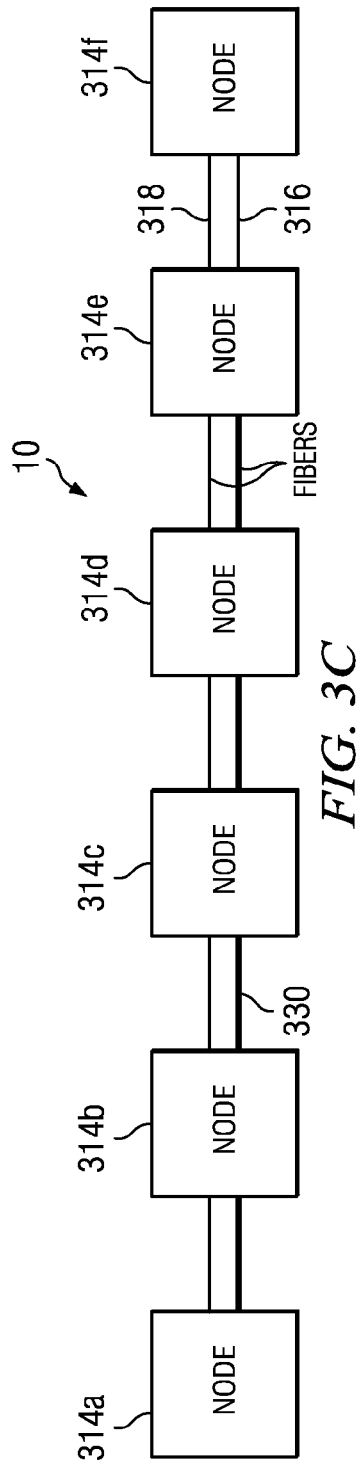

Additionally, nodes 14 may be configured to establish light-trail 30 and transmit or receive some or all optical traffic on light-trail 30. Light-trail 30 represents an optical path on a portion of fiber connecting any two or more components in optical network 10. Light-trail 30 is illustrated in FIG. 1 as a shaded portion of fiber 16. Once light-trail 30 is established, any of the nodes 14 connected to light-trail 30 may transmit optical traffic on light-trail 30 to nodes 14 located downstream from the transmitting node 14 in the direction traffic is propagating along light-trail 30. A particular node 14 may terminate or reconfigure light-trail 30 at any appropriate time. Additionally, as noted above, in particular embodiments, multiple light-trails may be established in optical ring 20, with each light-trail associated with a particular wavelength. Furthermore, multiple, non-overlapping light-trails may be associated with a common wavelength. The operation of a particular embodiment of optical network 10 in establishing a light-trail is illustrated in FIGS. 3A-3C.

As mentioned above, to coordinate the establishment and sharing of light-trails, optical network 10 supports an optical supervisory channel (OSC) or other out-of-band control channel on which control signals are exchanged between nodes 14 and/or other components of optical network 10. Nodes 14 may exchange control messages on the OSC to initiate and terminate light-trails and to manage use of established light-trails. In a particular embodiment, the OSC represents one or more wavelengths, among a plurality of wavelengths utilized by optical network 10, that are dedicated to control signals. Alternatively, the OSC may represent a separate fiber in optical ring 20 on which nodes 14 may exchange control signals. According to particular embodiments, control signals associated with a particular light-trail may be transmitted on the OSC in the direction of traffic on that light-trail, in a direction opposite to the direction of traffic on that light-trail, or in both directions on the OSC.

Use of light-trails may result in more efficient transmission of traffic between nodes 14. In particular embodiments, nodes 14 may be configured to use light-trails to transmit all traffic and may establish additional light-trails if the amount of traffic flowing on a particular light-trail exceeds a particular threshold, or if a particular node 14 is unable to transmit traffic (due to use of the light-trail by other nodes 14) that cannot be delayed. In general, however, nodes 14 may be configured to establish light-trails based on any appropriate criteria, factors, or considerations.

In particular embodiments, as described below in conjunction with FIG. 4, nodes 14 may use an auction technique to bid on the use of a light-trail (for example, based on the criticality of the node's need to transmit particular data). In other embodiments of optical network 10, nodes 14 may share use of a light-trail through a "round robin" or "weighted round robin" system. In yet other embodiments, a particular node 14 is granted use of an existing light-trail to transmit optical traffic to other nodes 14 based on a priority associated with that node 14. Thus, when more than one node 14 is attempting to transmit optical traffic on the same light-trail at the same time, an element of optical network 10 may determine which node 14 will be granted use of that light-trail based on a comparison of the priorities of the competing nodes 14. These techniques, or other suitable techniques for sharing a light-trail, may result in more efficient communication of information as transmission by certain nodes 14 or the transmission of certain information may be given priority over other transmissions, allowing, for example, particular nodes 14 to satisfy minimum quality of service (QoS) requirements for their transmissions.

FIG. 2 is a block diagram illustrating a particular embodiment of a node 14 for use in implementing light-trails. As shown, node 14 includes transport elements 50a and 50b, distributing/combining elements 80a and 80b, a managing element 120, a drop element 130, an add element 140, a burstponder 150, and a switching element 160. Transport elements 50 add traffic to and drop traffic from fibers 16 and 18. More specifically, transport elements 50 may generate one or more copies of optical signals propagating on fibers 16 and 18 for communication of particular portions of the traffic carried in these optical signals to devices coupled to node 14. Additionally, transport elements 50 may include components appropriate to add traffic generated by node 14 or received from client devices of node 14 to fibers 16 and 18. For example, in the illustrated embodiment, each transport element 50 includes a coupler 60a which splits traffic received by transport elements 50 into two copies and forwards one copy of the traffic to drop element 130, while forwarding the other copy along the relevant fiber. Furthermore, each transport element 50 includes a coupler 60b which adds traffic received from add element 140 to traffic already propagating on the associated fiber. Although two couplers 60a and 60b are illustrated in each transport element 50, particular embodiments may include a single coupler that both adds and drops traffic. Such a single coupler may be used, as an example, in particular embodiments which do not include a wavelength blocking unit 54 (as is described below).

Each transport element 50 also includes, in the illustrated embodiment, a wavelength blocking unit (WBU) 54 configured to terminate particular wavelengths of traffic propagating on fibers 16 and 18. As a result, traffic that has already been received by its intended destination or destinations may be terminated at a subsequent node 14. Furthermore, WBU 54 may be used to isolate a light-trail, as described below. Although shown as a functional block in FIG. 2, WBU 54 may represent and/or include suitable components configured in any appropriate manner to provide the functionality of dynamically blocking certain wavelengths and passing other wavelengths. As one example, WBU 54 may represent a wavelength-selective switch (WSS) operable to output any particular wavelength, or set of wavelengths, received at the input of WBU 54 on the output of WBU 54.

As another example, WBU 54 may represent a structure that includes an optical demultiplexer and an optical multiplexer connected by a series of switches. In such an embodiment, the demultiplexer may demultiplex the signal into its constituent channels. The switches may then be dynamically configured to selectively terminate or forward each channel to the multiplexer based on control signals received by each switch. The channels that are forwarded by the switches are received by the multiplexer, multiplexed into a WDM optical signal, and forwarded to downstream elements.

As another example, WBU 54 may represent a collection of tunable filters tuned to allow only traffic on appropriate wavelengths to be forwarded on fibers 16 or 18. In such an embodiment, a coupler of WBU 54 may receive optical signals input to WBU 54 and split the optical signals into a plurality of copies, transmitting each of these copies to a particular tunable filter. Each tunable filter may then selectively pass traffic propagating at a particular wavelength or within a particular range of wavelengths and block traffic propagating at all other wavelengths. Each tunable filter then forwards the passed traffic propagating at the associated wavelength or wavelengths to an output coupler of WBU 54. The output coupler then combines the output of the various tunable filters to produce an output WDM optical signal and forwards the output optical signal to components downstream from WBU 54.

Transport elements 50 may also include appropriate components to allow node 14 to transmit and receive information pertaining to the status and operation of fibers 16 and 18, other nodes, any light-trails established in network 10, or any other appropriate elements or functionality of optical network 10. In particular, each node 14 may include elements to allow node 14 to receive and transmit messages on an optical supervisory channel (OSC). In the illustrated embodiment, each transport element 50 includes an OSC ingress filter 66a that processes an ingress optical signal from its respective fiber 16 or 18. Each OSC filter 66a filters the OSC signal from the optical signal and forwards the OSC signal to a respective OSC receiver 112. Each OSC filter 66a also forwards the remaining optical signal to other components of transport element 50. Each transport element 50 also includes an OSC egress filter 66b that adds an OSC signal from an associated OSC transmitter 116 to the optical signal propagating on the associated fiber 16 or 18 and forwards the combined signal to elements located downstream on fiber 16 or 18. The added OSC signal may be locally-generated data or may be OSC data received by node 14 and passed through managing element 120.

Distributing/combining elements 80 may each comprise a drop signal splitter 82 and an add signal combiner 84. Splitters 82 may each comprise a coupler connected to one optical fiber ingress lead and a plurality of optical fiber egress leads which serve as drop leads 86. Each drop lead 86 may be connected to a drop element 130 associated with a particular local port of node 14. Although the illustrated embodiment shows a splitter 82 coupled to one drop lead 86, splitter 82 may be coupled to any appropriate number of drop leads 86.

Splitter 82 may, in general, represent any appropriate component or collection of components capable of splitting the optical signal received by splitter 82 into a plurality of copies each to be propagated on a particular drop lead 86. In particular embodiments in which four drop leads 86 are implemented, splitters 82 may each specifically comprise a 2×4 optical coupler, where one ingress lead is terminated, the other ingress lead is coupled to a coupler 60 via a fiber segment, and the four egress leads are used as drop leads 86.

Combiners 84 similarly may each comprise a coupler with multiple optical fiber ingress leads, which serve as add leads 88, and one optical fiber egress lead. Each add lead 88 may be connected to an add element 140 associated with a particular port of node 14. In particular embodiments in which combiner 84 is coupled to four ingress leads, combiner 84 may comprise a 2×4 optical coupler, where one egress lead is terminated, the other egress lead is coupled to a coupler via a fiber segment, and the four ingress leads comprise add leads 88. As with splitter 82, the described components of combiner 84 may be replaced by any suitable component or collection of components for combining a plurality of optical signal into a single output signal. Although the illustrated embodiment shows a combiner 84 coupled to one add lead 88, combiner 84 may be coupled to any appropriate number of add leads 88.

Drop elements 130 selectively couple ports of burstponder 150 to outputs of distributing/combining elements 80 through filters 100, which are each capable of isolating traffic in a different wavelength from each copy of the optical signal created by splitter 82. As a result, drop elements 130 may output particular wavelengths of traffic from fibers 16 and 18 to particular ports of burstponder 150. Add elements 140 also couple particular ports of burstponder 150 to combining/distributing elements 80. Drop element 130 and add element 140 may include, respectively, a drop switch 132 and an add switch 142, or other suitable components, to selectively connect associated ports of burstponder 150 to fiber 16 or 18. Alternatively, add switch 142 may be replaced by a coupler which can split a signal from the associated transmitter 104 and by a pair of shutters (one for each branch of the split signal) that can control whether the signal is added to fiber 16, fiber 18, or both fibers 16 and 18. As a result, drop element 130 and add element 140 may be utilized to support protection switching for node 14. Alternatively, particular embodiments of drop element 130 and add element 140 may omit drop switch 132 and add switch 142, respectively, and couple different ports of burstponder 150 to each fiber 16 and 18. Moreover, in particular embodiments, node 14 may include multiple drop elements 130 and/or add elements 140, each associated with a particular wavelength supported by optical network 10.

Burstponder 150 converts bursty or time-interleaved optical traffic received from drop elements 130 to seamless and continuous data traffic for delivery to client devices of node 14 and converts data traffic received from client devices to optical traffic for transmission on fiber 16 or 18 in bursts when the node 14 has use of the light-trail. As described above, burstponder 150 allows node 14 to time share a light-trail while creating an impression to client devices of the node 14 that the wavelength is available on a seamless and continuous basis. Burstponder 150 may include any appropriate number of receivers 102 operable to receive optical signals and generate electrical signals based on these optical signals and transmitters 104 operable to receive electrical signals and to transmit optical signals based on these electrical signals. Depending on the configuration of node 14, each of these receivers 102 and transmitters 104 may be fixed or tunable. Each of these receivers 102 and transmitters 104 may be a burst-mode receiver or transmitter. Such burst-mode receivers may have burst mode clock and data recovery operation. As described below, switching element 160 may represent any appropriate component or components for transmitting data traffic output by burstponder 150 to appropriate client devices of node 14 and for transmitting data traffic received from client devices of node 14 to burstponder 150. Although shown as part of node 14 in FIG. 2, switching element 160 may be physically separate from node 14.

Managing element 120 may comprise OSC receivers 112, OSC interfaces 114, OSC transmitters 116, and an element management system (EMS) 124. Each OSC receiver 112, OSC interface 114, and OSC transmitter 116 set forms an OSC unit for one of the fibers 16 or 18 in the node 14. The OSC units receive and transmit OSC signals for the EMS 124. EMS 124 may be communicably coupled to a network management system (NMS) 126. NMS 126 may reside within node 14, in a different node, or external to all nodes 14.

EMS 124 and/or NMS 126 may comprise logic encoded in media for performing network and/or node monitoring, failure detection, protection switching and loop back or localized testing functionality of the optical network 10. In a particular embodiment, EMS 124 and/or NMS 126 generate, transmit, receive, and/or process control messages associated with the establishment, operation, and termination of light-trails. Any logic included in EMS 124 or NMS 126 may comprise software encoded in a disk or other computer-readable medium, such as memory, and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of nodes 14, and the NMS 126 may thus be omitted as a separate, discrete element. Similarly, the OSC units may communicate directly with NMS 126 and EMS 124 omitted.

EMS 124 monitors and/or controls elements within node 14. For example, EMS 124 may control operation of transmitters 104, receivers 102, and WBU 54 to facilitate the establishment and use of light-trails. In the illustrated embodiment, EMS 124 receives an OSC signal from each of fiber 16 and 18 in an electrical format via an OSC receiver 112 associated with that fiber (the OSC receiver 112 obtains the signal via an OSC filter 66*a*). This OSC signal may include one or more of multiple types of control messages, as described above. EMS 124 may process the signal, forward the signal and/or loop-back the signal. EMS 124 may be operable to receive the electrical signal and resend the OSC signal via OSC transmitter 116 and OSC filter 66*b* to the next node on fiber 16 or 18, adding, if appropriate, locally-generated control messages or other suitable information to the OSC.

NMS 126 collects information from all nodes 14 in optical network 10 and is operable to process control messages transmitted by nodes 14 to manage particular aspects of the use of light-trails. For example, in a particular embodiment, NMS 126 may be operable to select a particular node 14 for transmission on a light-trail when multiple nodes 14 request use of the light-trail. As noted above, NMS 126 may represent a portion or all of EMSs 124 of all nodes 14 in optical network 10. Moreover, although the description below describes particular embodiments of optical network 10 in which functionality is divided between NMS 126 and EMSs 124 in a particular manner, in alternative embodiments the described functionality may be distributed between NMS 126 and EMSs 124 in any appropriate manner. Additionally, although NMS 126 and EMS 124, as shown in FIG. 2, represent, at least in part, components located within node 14, some or all of NMS 126 and/or EMS 124 may be located external to nodes 14.

Although not shown in FIG. 2, node 14 may also include a memory operable to store code associated with EMS 124, NMS 126, and/or other components of optical network 10, information specifying a wavelength assignment scheme utilized for protection traffic on optical network 10, and/or any other suitable information used during operation of optical network 10. Memory may represent one or more memory devices that are located within node 14 or that are physically separate from node 14. Additionally, memory may be shared with other components of optical network 10 including other nodes 14. Memory may represent computer disks, a hard disk memory, random access memory (RAM), read-only memory (ROM), or any other suitable storage media.

In operation, transport elements 50 receive traffic from fibers 16 and 18. In the illustrated embodiment, traffic received from fibers 16 and 18 includes an OSC signal, and transport elements 50 are operable to add and drop the OSC signal to and from fibers 16 and 18. More specifically, each OSC ingress filter 66*a* processes an ingress optical signal from its respective fiber 16 or 18. OSC ingress filter 66*a* filters the OSC signal from the optical signal and forwards the OSC signal to its respective OSC receiver 112. Each OSC ingress filter 66*a* also forwards the remaining transport optical signal to the associated amplifier 64. Amplifier 64 amplifies the signal and forwards the signal to its associated coupler 60*a*. In particular embodiments, amplifier 64 may be omitted, depending on the circumstances.

EMS 124 may process control messages transmitted by other nodes 14 or other components of optical network 10 and adjust operation of node 14 in response. In particular, EMS 124 may reconfigure WBU 54, transmitters 104, filters 100, receivers 102, and/or any other appropriate element of node 14 in response to control messages received by EMS 124. As one example, EMS 124 may, in response to receiving a setup message, configure a WBU 54 of node 14 to allow traffic propagating at a particular wavelength to pass through WBU 54. As another example, EMS 124 may, in response to receiving an intimation message from another node 14, tune a particular filter 100 and/or a particular receiver 102 to allow node 14 to receive optical traffic on a particular wavelength associated with a light-trail.

Furthermore, EMS 124 may also generate control messages for transmission to other nodes 14 or other components of optical network 10. For example, EMS 124 may generate electronic signals associated with setup messages, intimation messages, request messages, and/or any other appropriate type of control messages and communicate these electronic signals to OSC transmitter 116 to transmit optical signals representing the appropriate control message to the associated transport element 50. These control messages may then be added to the optical traffic on fiber 16 or 18, as appropriate.

Meanwhile, coupler 60*a* splits the signal from the amplifier 64 into two copies: a through signal that is forwarded to WBU 54 and a drop signal that is forwarded to distributing/combining element 80. Distributing/combining element 80 may then split the drop signal into one or more copies and forward the copies of the drop signal to one or more drop elements 130. In a particular embodiment, each drop element 130 includes a drop switch 132 that allows drop element 130 to selectively couple a drop signal from either fiber 16 or fiber 18 to a filter 100 included in that drop element 130. Additionally, filter 100 may be tuned to a particular wavelength. As a result, in such an embodiment, traffic propagating at a particular wavelength on the selected fiber is output to burstponder 150.

Burstponder 150 receives the output of a plurality of drop elements 130. A receiver 102 in burstponder 150 that is associated with each drop element 130 converts the optical signal received from that drop element 130 into data traffic. The data traffic generated by each receiver 102 is then output to switching element 160. In particular embodiments of node 14, burstponder 150 may include buffers (not shown) and the output of receivers 102 may be stored in one or more buffers to be transmitted to switching element 160 at an appropriate time.

Switching element 160 receives seamless and continuous data traffic output by burstponder 150 and switches this data traffic in any appropriate manner to facilitate transmission of this data traffic to an appropriate client device of node 14. The data traffic received by switching element 160 from burstponder 150 may include information in the form of packets, frames, and/or datagrams, and/or information structured in any other appropriate form. For example, in a particular embodiment, switching element 160 may represent an L2 switch and may receive electrical signals from burstponder 150 in the form of packets.

Switching element 160 also receives data traffic from client devices coupled to switching element 160 and switches this data traffic to communicate the data traffic to an appropriate port of burstponder 150. The data traffic received by switching element 160 from the client devices may include information in the form of packets, frames, and/or datagrams, and/or information structured in any other appropriate form. As noted above, switching element 160 may represent an L2 switch and may receive data traffic from the client devices in the form of packets. In such an embodiment, the L2 switch may switch each packet, based on a header included in that packet, to deliver the packet to a port of the L2 switch coupled to an appropriate port of burstponder 150.

Burstponder 150 receives data traffic from switching element 160 on one or more ports of burstponder 150. Certain ports of burstponder 150 are configured to receive data traffic from switching element 160, and each of these ports may pass the received data traffic to a particular transmitter 104 in burstponder 150 associated with that port. Each transmitter 104 may then generate a burst of optical traffic from the data traffic received from switching element 160 and transmit that optical traffic to a particular add element 140 associated with that transmitter 104. In particular embodiments, EMS 124 may tune transmitters 104 of burstponder 150, and transmitters 104 may generate optical traffic at a particular wavelength determined by EMS 124. In other embodiments, transmitters 104 transmit at a fixed wavelength. Additionally, burstponder 150 may include one or more buffers that store data traffic from switching element 160 to be input to transmitter 104 at an appropriate time (such as when the node is granted use of a light-trail). Such buffering is useful since a node 14 may not be able to transmit traffic when it is received because another node 14 is using a shared light-trail.

Optical traffic output by transmitters 104 of burstponder 150 is then received by an appropriate add element 140 associated with the transmitter 104 that generated the optical traffic. Each add element 140 may include an add switch 142 capable of selectively coupling that add element to a combiner 84 in a distributing/combining element 80 associated with either fiber 16 or 18. As a result, optical traffic generated by transmitters 104 of burstponder 150 may be added to an appropriate fiber 16 or 18 based on the circumstances. For example, particular embodiments of node 14 may support protection switching and add switch 142 may be reconfigured in response to the detection of a fault on one fiber to transmit optical traffic on the other fiber. The appropriate distributing/combining element 80 then forwards the optical traffic received from burstponder 150 to the coupler 60b of the associated fiber.

Returning to the operation of couplers 60a, in addition to forwarding the drop signal as described above, each coupler 60a forwards the through signal to its respective WBU 54. WBUs 54 receive the optical signal and selectively terminate or forward channels of the through signal. In a particular embodiment of node 14, EMS 124 may control operation of WBU 54 to establish a light-trail on a specified wavelength on a particular fiber 16 or 18 in response to a setup message received from a convener node 14a. In particular, if node 14 represents a node on the interior of the requested light-trail, EMS 124 may configure WBU 54 to allow optical signals propagating at the specified wavelength on the relevant fiber to pass through WBU 54. If node 14 represents a node 14 at the beginning or end of a light-trail, EMS 124 may configure WBU 54 to block optical signals propagating at the specified wavelength on the relevant fiber. In this way, traffic transmitted by a node in a light-trail does not leave the light-trail. Because of this, multiple non-overlapping light-trails may be formed using the same wavelength in the same fiber.

In particular embodiments, however, WBUs 54 may be omitted from the node. In such embodiments, the node will be unable to block the transmission of traffic through the node (since there would be nothing to terminate any of the wavelengths of the copy of the optical signal forwarded from couplers 60a). Therefore, in such embodiments, multiple light-trails may not be formed in the same wavelength. However, in many network topologies, such as ring networks, at least one such node (or some other device in the network) must be able to stop the propagation of optical signals added from the nodes around the network to prevent interference. As an example, otherwise traffic being added in a particular wavelength at a node will propagate around the network and return to the adding node, where it will interfere with new traffic being added in that wavelength. Therefore, particular embodiments may include one or more nodes that include a WBU (such as nodes 14) and one or more other nodes that do not include a WBU. If multiple nodes that include a WBU are used in such embodiments, it may be possible to create multiple light-trails in a single wavelength; however, the locations of these light-trails would be limited according to the number and placement of the nodes including the WBUs.

Returning to the operation of the illustrated node 14, each coupler 60b may subsequently combine the output of the associated WBU 54 with the traffic received from an associated combiner 84. After coupler 60b adds locally-derived traffic to the output of WBU 54, coupler 60b forwards the combined signal to the associated amplifier 64 and OSC egress filter 66b. Each OSC egress filter 66b adds an OSC signal from the associated OSC transmitter 116 to the combined optical signal and forwards the new combined signal as an egress transport signal to the associated fiber 16 or 18 of optical network 10.

FIGS. 3A-3C illustrate example operation of nodes of an optical network in establishing a light-trail 330 (shown in FIG. 3C). In particular, FIGS. 3A-3C illustrate an example operation of a particular embodiment of an optical network as a particular node 314 attempts to establish a light-trail 330 in response to receiving data traffic from a client device of that node 314. Nodes 314 and fibers 316 and 318 shown in FIGS. 3A-3C may represent a complete optical network or may represent a portion of a larger optical network, such as optical network 10 shown in FIG. 1. Furthermore, although shown as being coupled in a linear manner, nodes 314 may be coupled in a ring, a mesh, or in any other suitable fashion. For example, nodes 314a-f may represent nodes 14a-f of network 10 of FIG. 1. Moreover, nodes 314 may have any suitable design. As an example only, nodes 314 may be implemented using the configuration illustrated in FIG. 2 or any other appropriate configuration.

FIG. 3A illustrates an example operation of an optical network as node 314a (referred to below as "convener node 314a") receives data traffic 310 from a client device coupled to convener node 314a. To transmit optical traffic based on the data traffic, convener node 314a determines that a light-trail 330 should be established between convener node 314a and node 314e (referred to below as "end node 314e") along fiber 16. As indicated above, convener node 314a may decide to establish light-trail 330 in response to determining that the amount of optical traffic flowing on other light-trails that couple convener node 314a and end node 314e exceeds a predetermined threshold. Alternatively, any other node or device may initiate the establishment of light-trail 330 for any suitable purpose.

Convener node 314a may establish light-trail 330 by sending one or more control messages to end node 314e and/or other nodes 314 on the OSC or other control channel. As used herein, a "message" may represent one or more signal pulses, packets, or frames, or information structured in any other suitable format. For example, in a particular embodiment, convener node 314a transmits a setup message 340 to end node 314e and to all nodes 314b-d between this particular convener node 314a and end node 314e in the direction of traffic. These nodes between the convener node and end node that are to be included in the light-trail may be referred to as "intervening nodes" (it should be noted, however, that not every node between the convener node and end node need be included in a light-trail). Depending on the configuration of the optical network, convener node 314a may transmit setup message 340 on the OSC in the same direction as optical traffic is flowing on fiber 316, in the opposite direction (for example, the OSC on fiber 318), or in both directions (for example, the OSC on both fibers 16 and 18). In the illustrated example, the OSC is assumed to represent a separate wavelength from the wavelengths used to transmit data on fiber 316, and convener node 314a transmits setup message 340 on fiber 316 in the direction traffic is propagating on fiber 316.

Setup message 340 may identify convener node 314a and end node 314e, specify the direction and wavelength to be used for transmissions on light-trail 330, and/or include any other appropriate information to be used by intervening nodes 314b-d and end node 314e to establish light-trail 330. Intervening nodes 314b-d may store setup message 340 until receiving an appropriate indication from end node 314e, such as an acknowledgement message, that end node 314e is prepared to establish light-trail 330.

FIG. 3B illustrates an example operation of the optical network after end node 314e receives setup message 340. End node 314e, in response to receiving setup message 340, may reconfigure a wavelength blocking unit of end node 314e to prevent traffic propagating at the wavelength associated with the requested light-trail 330 from continuing past end node 314e on fiber 316. End node 314e transmits an acknowledgement message 350 to convener node 314a and/or intervening nodes 314b-d once end node 314e has configured the wavelength blocking unit or at any other appropriate time after receiving setup message 340. Acknowledgement message 350 indicates to nodes 314 receiving the acknowledgment message that end node 314e is ready to establish light-trail 330. Convener node 314a and/or intervening nodes 314b-d may configure themselves in any appropriate manner to facilitate establishment of the light-trail, in response to receiving the acknowledgement message 350 or another appropriate form of indication from end node 314e. For example, intervening nodes 314b-d may each reconfigure a wavelength blocking unit of each node 314 to allow the wavelength associated with light-trail 330 to pass through that particular node 314. Additionally, convener node 314a may configure a wavelength blocking unit of convener node 314a to block traffic propagating on fiber 316 at the wavelength, as described above with respect to FIG. 2. By blocking traffic propagating on fiber 316 at the wavelength associated with light-trail 330, convener node 314a may allow other light-trails that do not overlap with light-trail 330 to utilize the same wavelength as light-trail 330 without interfering with traffic transmitted on light-trail 330.

Additionally, each node 314 may maintain a light-trail table or matrix that maintains information regarding light-trails established on optical network 10 or light-trails to which that node 314 is coupled. These light-trail tables may include any appropriate information for the relevant light-trails. For example, light-trail tables may include information specifying the convener node and end node of each light-trail, the wavelength associated with each light-trail, whether each light-trail is currently being used, and/or any other suitable information about each light-trail.

FIG. 3C illustrates a state of optical network 10 after node 314a receives acknowledgement message 350 and performs any appropriate reconfiguration. As a result of the reconfiguration of convener node 314a, intervening nodes 314b-d and end node 314e, light-trail 330 is formed which couples convener node 314a to each intervening node 314b-d and to end node 314e. Once light-trail 330 is established, convener node 314a and/or intervening nodes 314b-d may utilize light-trail 330 for transmissions to downstream intervening nodes 314b-d or to end node 314e. Example operation of nodes in transmitting optical traffic on an established light-trail is described below with respect to FIG. 4.

As mentioned above in conjunction with FIG. 1, one technique that may be used to allocate use of a light-trail between the nodes included in that light-trail is an auction technique. Auction algorithms provide a real-time method for arbitrating between users and objects. In this case, the nodes are users and light-trails (more particularly, data slots in a light-trail) are the objects. Such an auction mechanism provides an efficient, fair, and stable technique to converge to a solution to the parallel problem of arbitrating between a number of nodes requesting the use of an established light-trail. In this technique, each node requiring use of a light-trail places a bid for use of the light-trail during a specified period (such as for a particular time slot). Such a bid will be based on the node's network parameters and its requirement for the light-trail, as described below.

In particular embodiments, bids are placed contiguously with fixed periodicity using a slotted system. Two levels of time-slotted hierarchy exist in such embodiments: at the control layer and at the data layer. At the control layer, the control channel (for example, the OSC) may be synchronized between the nodes since the control channel is optically dropped and electronically processed at each node. The time slots may be of a small duration/length (for example, measured in microseconds) that is just large enough to carry bids from nodes and/or to carry any other signaling information. The time slots at the data layer are larger (for example, a few milliseconds) than the slots of the control channel. At the data layer, the slots of each data channel are synchronized with respect to the control channel. In other words, the data transmission timings are controlled by the control channel, and since the control channel itself is synchronized, the data layer is also synchronized. Since the slots of the control channel are smaller than the data slots, a number of control slots will occur in the control channel during the duration of a single data slot in each data channel.

The upper bound of the duration of each data slot may depend on the minimum latency requirement of the node traffic having the highest degree of stringency. As an example only, if d is the maximum permissible latency of the traffic with highest stringency, and p is the maximum propagation delay, then the maximum allowable control packet size may be (d−p)/2WN seconds in duration. Based on this calculation, the control channel line rate ($C_{control}$) may be defined as:

$$C_{control} = 2WNb_{control}/(d-p)$$

where, $b_{control}$ is the number of bits in a control packet.

Furthermore, the lower bound on data slot duration may be restricted in particular embodiments by the number of control messages that must be transmitted in the control channel (in other words, the number of required control slots) during the duration of a data slot, as well as the line rates for the control and data channels. This lower bound ensures that the control channel provides enough capacity for all potentially-able nodes to bid on light-paths established at every wavelength of the network. For example, if a network includes six nodes (such as network 10) and has twenty data channels, then one hundred twenty control slots will occur in the control channel during the time that one data slot occurs in each of the twenty data channels. Each of these control slots may be associated with a particular node and with a particular light-trail.

In embodiments implementing the auction technique, nodes may bid on the use of each individual data slot in each light-trail. Each node may bid on a particular data slot of a particular light-trail by inserting a control message into one of the control slots corresponding with the data slot that is just before the data slot being bid on. In other words, in such embodiments, the control slots that are synchronized with a particular data slot will include bids from one or more nodes for use of the next data slot. As is described in greater detail below, in particular embodiments these bids may be based on two parameters: criticality (generally, the service needed by the traffic from a node and the amount of traffic buffered at the node) and staticity (generally, the quality and quantity of the node's previous use of the light-trail). Both of these parameters help translate buffer and service statistics into auction bids. Each node may include software stored in a computer-readable medium or firmware that is used to calculate the bids for that node. As an example only, this software or firmware may be associated with the element management system.

These bids are then sent to one of the nodes in the light-trail (or some other suitable node or device) that acts as a controller for the light-trail. In particular embodiments, this controller is the end node of a light-trail. Upon receiving bids from the nodes in a light-trail, the end node of each light-trail computes the highest bid that it received from nodes in the light-trail and decides (based on an algorithm described below) which node should have transmission rights to the next data slot in the light-trail. The end node send control messages in the control channel to the other nodes in the light-trail indicating the node that was assigned the next data slot. These control messages may be sent on a different control channel that is transmitted in the opposite direction of the control channel in which the bids were transmitted (such as the OSC on the opposite fiber), they may be sent in the same control channel, or some may be sent in one direction and some in the other (for example, if the controller is one of the intervening nodes). This process, which is described in further detail below, repeats for each data slot.

Figure 4:
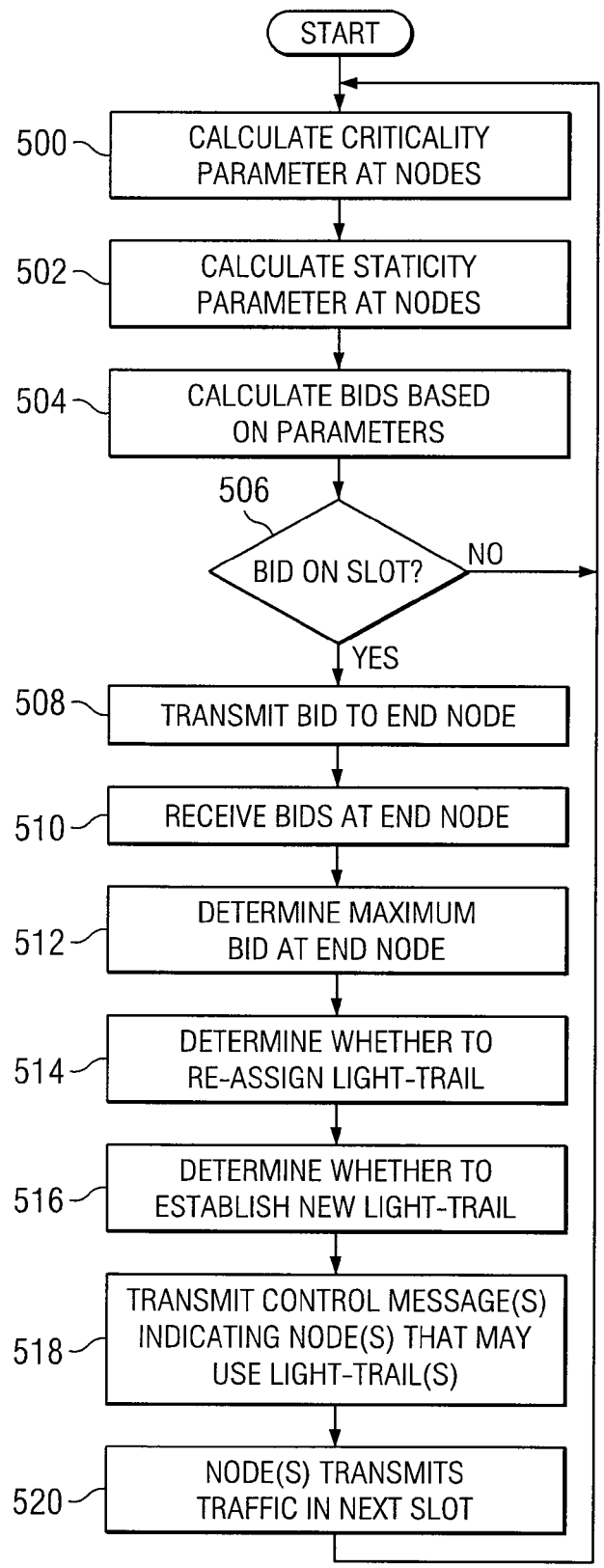
FIG. 4 is a flowchart illustrating an example auction technique for sharing the use of a light-trail established in the optical network.

FIG. 4 is a flowchart illustrating an example method for the auctioning of data slots in a light-trail. The example method describes the process for bidding on and using a single data slot in a particular light-trail. This method may be repeated for each data slot in the light-trail, as well as be performed for data slots of other light-trails in a network. Furthermore, although this example method describes bidding for each data slot in a light-trail, any other suitable "objects" may be bid on (as an example, use of the light-trail for a longer period of time (multiple data slots)). Moreover, although the bids are calculated based on criticality and staticity parameters in the manner described below, other embodiments of the present invention may calculate these parameters differently than described below and/or may use alternative or additional parameters to calculate bids.

For the calculations of bids in the example auction method, the following variables are defined:

N: The number of nodes in the network, where $N_i$ is a particular node

B(t): an N×N matrix that denotes the occupancy levels of the buffers of all nodes $B_{ik}(t)$: the occupancy level of a buffer at a particular node i at time t with data intended for transmission in light-trail k Service types of the traffic buffered at a node: S={1, 2, 3, 4, ... h, ..., s}, where $S_h$ is the $h^{th}$ service type, and $\Delta_1 > \Delta_2 > \Delta_3 > ... \Delta_s$, where $\Delta_{S_h}$ is the maximum allowable delay for service $S_h$ C: the light-trail bit-rate $t_c$: The connection provisioning time in a light-trail w: The time required to set up a light-trail $T_{data}$: The duration of data slot Nodes implementing the example auction method use these variables to determine the criticality and staticity parameters, which are then used to calculate a bid. The example method, as illustrated in FIG. 4, begins at step 500 where each node contending for a particular data slot in a particular light-trail calculates it criticality. Criticality is a representation of the urgency of a node to provision a connection in a particular light-trail. In the example embodiment, criticality depends on two factors: service delay and buffer occupancy. The former represents the need to provision connections in a light-trail assuming the end-to-end service delay, while the latter represents the occupancy of a buffer with respect to the total available memory in the buffer. For computing criticality, the following variables are used:

$\sigma_{ik}(t)$: The number of data slots that have occurred since the last successful bid by node i for light-trail k.

$\Psi_{ik}(t)$: The critical allowable limit of buffer at node i for data intended for transmission in the $k^{th}$ light-trail at time t.

The critical allowable limit $\Psi_{ik}(t)$ depends on the time at which the first packet (or other suitable form of traffic) with service type $S_h$ arrived in the buffer as compared to any packet of other service types having less stringent latency requirements than service type h. $\Psi_{ik}(t)$ is calculated as follows:

$$\Psi_{ik}(t) = \min[\Delta_{S_i} - x_i, \Delta_{S_h}], i = 1, 2, \ldots, s$$

where $x_i$ is the time since the first packet of service i entered the buffer $B_{ik}$. Note that the critical allowable limit is independent of flow statistics and is a time-dependent value (meaning it can change for each data slot).

Using the critical allowable limit, the criticality parameter for a buffer at node i at time t for light-trail k can be calculated. The criticality parameter, $\alpha_{ik}(t)$, is defined as the maximum of the two ratios of service criticality and buffer criticality. Thus, the criticality parameter is calculated as follows:

$$\alpha_{ik}(t) = \max\left[\frac{\sigma_{ik}(t)}{\Psi_{ik}(t)}, \frac{B_{ik}(t)}{B_{max}}\right]$$

where $\alpha_{ik}(t)$ is the criticality parameter of node i with reference to light-trail k at time t, and $B_{max}$ is the buffer size in bits. For normal operations, $0 \leq \alpha_{ik}(t) \leq 1$. Thus, in general, the criticality parameter is determined to be higher of either a ratio reflecting the criticality caused by the service requirements for the traffic having the most stringent latency requirements or a ratio reflecting the criticality caused by the node's buffer reaching its capacity. Although this calculation of criticality may indicate the node that has the most critical need for a light-trail at any given instant, "ringing" will typically occur if criticality is the only parameter considered in placing a bid. "Ringing" is rapid switching between nodes having the right to transmit traffic on the light-trail, which creates inefficiencies.

Therefore, at step 502 of the example method, each node also calculates a staticity parameter. As described above, staticity is a parameter that gives a measure of the quality and longevity of a connection (use of a light-trail by a node). For a given connection, staticity is defined according to the following ratio:

$$ST_{ik}(t) = \frac{\text{connection duration}}{\text{connection quality}}$$

For a given connection in the $k^{th}$ light-trail between node i and some other node, if the connection duration is $T_{DC}$ (which is self-explanatory) then staticity for this connection is calculated as follows (indicating how connection quality is determined):

$$ST_{ik}(t) = \frac{T_{DC}}{1 - \left[\frac{1}{T_{DC}C}\sum_{i=t-T_{DC}}^{t} B_{ik}(t)\right]}$$

For normal operations, $0 \leq ST_{ik}(t) \leq 1$.

Based on the criticality and staticity calculations, each node contending for a particular data slot of light-trail k calculates a bid at step 504. The bid is calculated as the smaller of two quantities: (i) the maximum successful bid for the previous data slot, or (ii) the sum of the criticality and staticity parameters for the node at the beginning of the current data slot. In particular embodiments, an amount c is also added to the smaller of these two quantities. This amount ε enables complementary slackness—a condition defined in Bertsekas, D. P., "Auction Algorithms," Lab. for Information and Decision Systems Working Paper, M.I.T., Cambridge, Mass., pp. 6-8—to help achieve orthogonality between nodes. The value of ε is node-specific and is given a value of $1/(h-1)$ of the maximum bid for the previous data slot, where h is the average number of nodes in a light-trail (typically between 3N/8 and 5N/8 for an N-node ring network with symmetric traffic demands). Therefore, a node i computes a bid for light-trail k at time t as follows:

$$\text{bid}_{ik}(t) = \min[\alpha_{ik}(t) + ST_{ik}(t), m\text{bid}_{ik}(t-1)] + \epsilon$$

After calculating a bid at step 504, each node bidding on a data slot determines whether to place the bid at step 506. For a given bidding cycle, every node computes a bid for every light-trail that is of interest to the node (for example, light-trails that include the destination node for the traffic that a node desires to transmit). However, in particular embodiments, a node will not necessarily place all of the bids that it calculates. In determining whether to place a bid, each node i determines a quantity, $a_{ik}(t)$, that represents the benefit of light-trail k to that node at time t. This benefit depends on the previous history of the node with the light-trail, and is calculated as follows:

$$a_{ik}(t) = \alpha_{ik}(t) - m\text{bid}_k(t-1)$$

where $\alpha_{ik}(t)$ is the criticality parameter of node i with respect to light-trail k and where $m\text{bid}_k(t-1)$ is the maximum bid for the previous data slot in light-trail k (this maximum bid for the previous data slot may communicated by the end nodes of the light-trail to the other nodes in the light-trail). Each node determines this benefit at step 506 and decides to bid on a light-trail k if the net benefit of the light-trail denoted by $a_{ik}(t)$ for that node is maximum amongst all light-trails available to that node. If a node decides not to bid on particular light-trails, the example method (for those light-trails) returns to the start of the method and the method begins again for subsequent data slots in the light-trails. If a node decides to bid on a light-trail, the method (for that light-trail) proceeds to step 508 where the node transmits the bid in an appropriate control slot in the control channel (for example, a control slot associated with the node and with the light-trail being bid on).

At step 510, the end node for each light-trail in the network (or other node designated as the arbiter node to receive bids and allocate the light-trail) receives bids from nodes in that light-trail for a particular data slot. The end node (or other arbiter node) may receive bids by retrieving and processing the contents of particular control slots that are associated with its light-trail. After receiving the bids for a particular data slot, at step 512 the end node determines the maximum bid that was received and from which node it was transmitted. However, the node placing the highest bid does not necessarily receive permission to use the light-trail. Instead, at step 514 the end node decides whether to re-assign the light-trail to the node placing the highest bid or to permit the node that was most recently assigned the light-trail to continue transmitting. In the example embodiment, the end node determines a "prevailing price," $p_k(t)$, of a light-trail k at time t as follows:

$$P_k(t) = m\text{bid}_k(t-1) - CT_{data}$$

The end node then uses this prevailing price for the light-trail to determine at step 514 whether to re-assign the light-trail. If the maximum bid received for a data slot is greater than or equal to the calculated prevailing price ($m\text{bid}_k(t) \geq p_k(t)$), then the light-trail is re-assigned to the node that sent the maximum bid. If the maximum bid received for a data slot is less than the calculated prevailing price ($m\text{bid}_k(t) \leq p_k(t)$), then the status quo is maintained and the light-trail is not reassigned from the node that was previously assigned the light-trail (even though that node did not submit the highest bid).

In certain cases, although a node may not be assigned a light-trail, the conditions associated with that node (the criticality and/or the staticity) may require that a new light-trail be established so that the node may transmit its traffic. Therefore, the end node determines at step 516 whether new light-trails are needed. For example, if ($m\text{bid}_k(t) < p_k(t)$) and $\alpha_k(t) > 1 - w/\Delta_S$ for the node transmitting the maximum bid, then this signifies the need to set up a new light-trail for that node. Similarly, if a node bidding on a light-trail k is not assigned the light-trail and if $\Psi_{ik}(t) - w \leq B_{ik}(t) \geq \Psi_{ik}(t) - w - t_c$ for that node (node i), then a new light-trail needs to be set up for that node.

At step 518, the end node transmits a control message to each of the nodes in the light-trail indicating which node has been assigned the light-trail (either the node placing the highest bid or the node that was previously assigned the light-trail). In particular embodiments in which the network allows traffic to be transmitted in opposite directions (such as a bi-directional ring), the control messages from the end node to the other nodes in the light-trail may be communicated in the OSC that is transmitted in the opposite direction of the OSC that the other nodes used to submit the bids. This ensures that the response to the bids from the end nodes reaches the other nodes in the most time-efficient manner. Furthermore, if a new light-trail needs to be established, the end node may initiate its establishment and may send a control signal to the node for which the new light-trail was established indicating that it has been assigned the new light-trail. Alternatively, the node needing the new light-trail may establish the light-trail. In either case, the node needing the new light-trail may be the convener node in the new light-trail.

At step 520, the nodes in the light-trail receive the control messages and the node that has been assigned the light-trail transmits traffic in the data slot that was being bid on. Furthermore, if a new light-trail was established, the node assigned to that light-trail also transmits traffic on that new light-trail. The example method then returns to its beginning where the process is repeated for the next data slot in each light-trail in the network. It should be understood that some of the steps illustrated in this flowchart may be combined, modified or deleted where appropriate, and additional steps may also be added to the flowchart. Additionally, the steps may be performed in any suitable order.

Figure 5B:
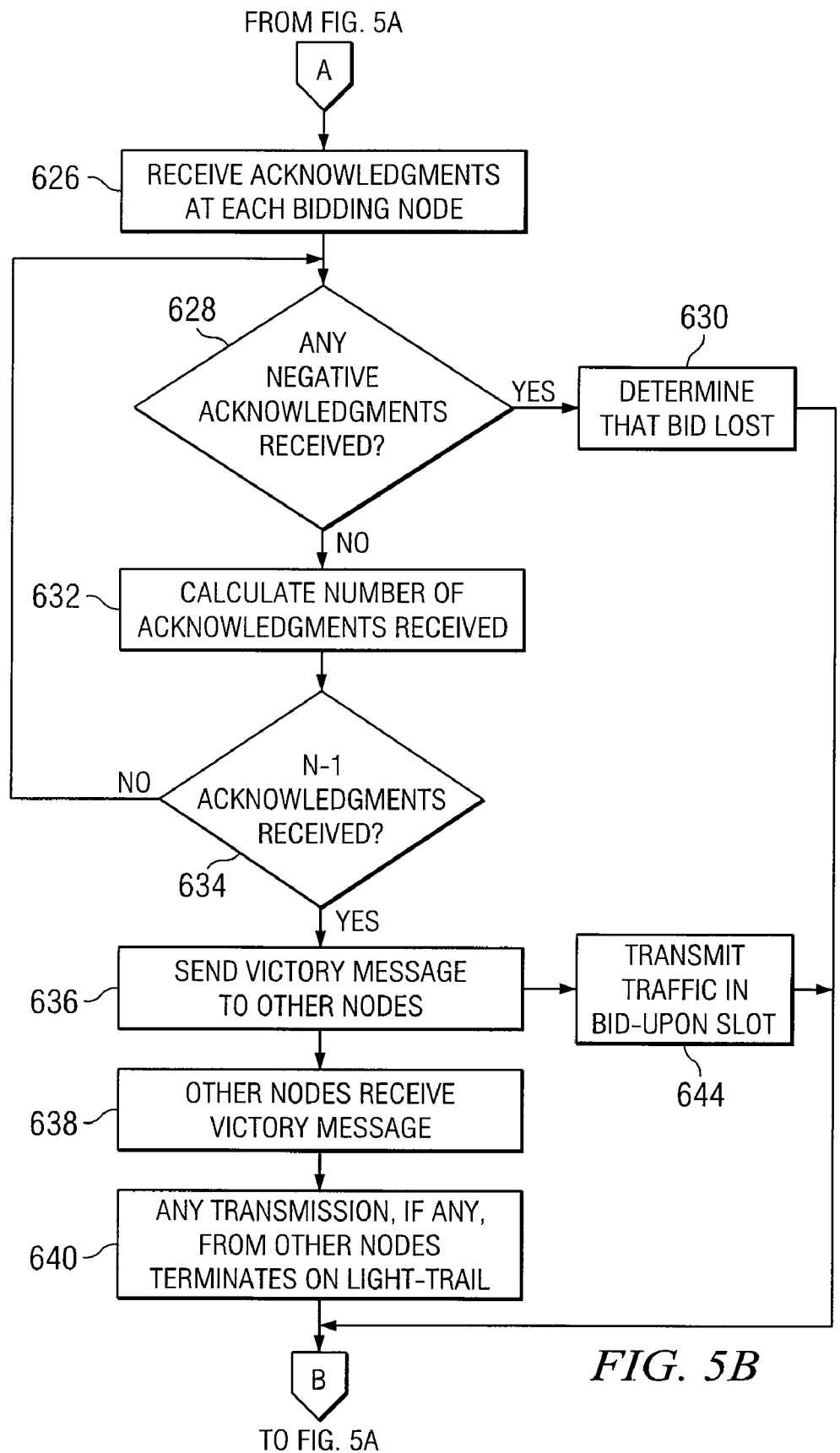

FIGS. 5A and 5B are flowcharts illustrating another example auction technique for sharing the use of a light-trail established in the optical network. As opposed to having an arbiter determine the allocation of the light-trail based upon received bids as in the example auction technique of FIG. 4, the example auction technique of FIGS. 5A and 5B is arbiter-less, dispersing the arbiter functions to each node in the light-trail, as described below. The example method describes the process for bidding on and using a single data slot in a particular light-trail. This method may be repeated for each data slot in the light-trail, as well as be performed for data slots of other light-trails in a network. Furthermore, although this example method describes bidding for each data slot in a light-trail, any other suitable "objects" may be bid on (as an example, use of the light-trail for a longer period of time (multiple data slots)). Moreover, although the bids are calculated based on criticality and staticity parameters (as described above), other embodiments of the present invention may calculate these parameters differently and/or may use alternative or additional parameters to calculate bids.

The example method, as illustrated in FIG. 5A, begins at step 600 where each node contending for a particular data slot in a particular light-trail calculates its criticality. Since the end node of the light-trail does not compete for data slots in the light-trail of this embodiment, the end node may not calculate its criticality (or a bid, for that matter). Because the calculation of criticality at step 600 is described above in the description of the example auction method of FIG. 4 at step 500, the step of calculating criticality will not be described again.

After calculating criticality at step 600, each node calculates its staticity at step 602. Because the calculation of staticity is described above in the description of the example auction method of FIG. 4 at step 502, the step of calculating staticity will not be described again.

In a similar manner as described with reference to step 504 above, based on the criticality and staticity calculations, each node contending for a particular data slot of light-trail k calculates a bid at step 604. As described below, it should be noted that for those nodes not contending for a particular data slot in a particular light-trail, in some embodiments, they may assign themselves a place-holder bid such as zero. Thus, their bids will never be greater than the bids of nodes contending for a particular data-slot in a light-trail.

After calculating a bid at step 604, each node bidding on a data slot may determine whether to place the bid at step 606, as described with reference to step 506 above. As part of the calculation of whether to place the bid at step 606, each node may calculate and consider the prevailing price. In the method of FIG. 4, the arbiter node may decide whether to re-assign a light-trail to a node placing the highest bid or whether to permit the node that was most recently assigned the light-trail to continue transmitting. The arbiter may decide this through the example "prevailing price" equation described above. In the method of FIGS. 5A and 5B, in particular embodiments, this "prevailing price" factor may be taken into account by each individual node when determining whether to bid on a data slot (since there is no arbiter node). In such cases, each node considers whether the node's own bid would overcome the prevailing price. If the node's own bid does not overcome the prevailing price, the node may not place a bid for the data slot. If the node's own bid does overcome the prevailing price, the node may place a bid for the data slot. In particular embodiments, each node may calculate the prevailing price according to the formula described in conjunction with step 514 of FIG. 4.

The step of comparing a bid to the prevailing price may alternatively be performed, in other embodiments, by the bidding node that wins the bid for the data slot (and not by all nodes when determining whether to place bids). Based on the prevailing price, the winning node may determine whether to transmit its traffic in the bidded-on data slot or whether to allow the previously prevailing node to continue transmitting in the bidded-on data slot.

If a node decides to bid on a light-trail, the method (for that light-trail) proceeds to step 608 where each bidding node transmits its bid in an appropriate control slot in the control channel (for example, a control slot associated with the node and with the light-trail being bid on). Each bidding node transmits the bid to the nearest upstream node and nearest downstream node, if any, on the light-trail (thus, a control channel in each direction is used to send bids). These nodes are referred to as "bid receiving" nodes with respect to the bidding node (but may also transmit their own bid as well, as discussed above). Again, a node may be both a bidding node and a bid receiving node when more than one node bids on a light-trail (which may be typical). Thus, a bidding node may act as a bid receiving node with regard to the bid of another bidding node. If a bidding node is the convening node of the light-trail, then the convening node transmits its bid to its nearest downstream node (and not to its nearest upstream node on the light-trail since no such node exists for that particular light-trail). It should be noted that the "upstream" and "downstream" directions are identified herein relative to the flow of traffic in the light-trail.

At step 610, each bid receiving node receives a bid from the neighboring bidding node(s). Nodes between the convener node and the end node may receive bids from an upstream bidding node and a downstream bidding node. The convener node and the end node may receive bids from a downstream bidding node and an upstream bidding node, respectively.

At step 612, each bid receiving node determines whether the received bid is greater than its own calculated bid. The bid receiving node does so by comparing the received bid to its own calculated bid. If the received bid is greater than the bid receiving node's bid, then the bid receiving node generates a positive acknowledgment indicating that the received bid is greater than its own bid at step 614. At step 616, the positive acknowledgment is sent by the bid receiving node to the bidding node. If the bid receiving node is a node upstream to the bidding node, then at step 618, the bid receiving node passes the received bid to the next upstream node in the light-trail, if any. If the bid receiving node is a node downstream to the bidding node, then at step 618, the bid receiving node passes the received bid to the next downstream node, if any. In either case, at step 618, the bid receiving node passes the received bid to the next node in the direction along the light-trail that the bid was traveling when the bid receiving node received the bid. The next upstream node or the next downstream node, if any, to which the bid is passed now acts as a "bid receiving" node with respect to the passed bid, and the method beginning at step 612 repeats itself with respect to the new "bid receiving" node.

If, at step 612, the bid receiving node determines that the received bid is not greater than the bid receiving node's bid, then the bid receiving node generates a negative acknowledgment indicating that the received bid is less than its own bid at step 620. At step 622, the negative acknowledgment is sent by the bid receiving node to the bidding node. At step 624, the bid receiving node terminates ("squashes") the bidding node's bid and does not pass the bid to another node.

At step 626, illustrated in FIG. 5B, each bidding node receives acknowledgments from one or more of the other nodes in the light-trail (in their capacity as bid receiving nodes). For a particular bid, the bidding node determines whether any acknowledgment received has been a negative acknowledgment at step 628. If a bidding node determines that any acknowledgment received has been a negative acknowledgment, the bidding node, at step 630, determines that its bid was not the highest bid for that particular data slot and does not transmit traffic in the bidded-on slot. The method beginning at step 600 of FIG. 5A begins again for that node for subsequent data slots in the light-trail.

If, at step 628, a bidding node determines that no negative acknowledgment has been received, the bidding node may sum, at step 632, the positive acknowledgments received. The bidding node may then determine at step 634 whether the sum of the positive acknowledgments received is equal to the number of nodes in the light-trail minus one. This number corresponds to receiving acknowledgments from all of the other nodes in the light-trail. If the sum of positive acknowledgments equals the number of nodes in the light trail minus one, this indicates to the bidding node that its bid is the highest bid among all of the nodes for the bidded-on slot in the light trail and the method proceeds to step 636.

The determination of the number of acknowledgments received assumes that the end node of the light-trail would send an acknowledgment to each bidding node acknowledging that the end node's bid is lower than the received bid. Since the end node of a light-trail does not transmit data on the light-trail and thus does not bid on the light-trail, in particular embodiments, the end node may assign itself a bid of zero. In the embodiments in which the end node does not calculate a bid at all or does not even participate in the example process of FIGS. 5A and 5B, the end node may not send an acknowledgment to a bidding node. In such a case, a bidding node may determine that it has the highest bid if the sum of positive acknowledgments equals the number of nodes in the light trail minus two (accounting for the node itself and the non-acknowledging end node).

At step 636, if a particular bidding node has not received any negative acknowledgments and the particular bidding node has received N−1 acknowledgments, that particular node transmits to the other nodes included in the light-trail a victory message in an appropriate control slot in the control channel (for example, a control slot associated with the node and with the light-trail being bid on). The other nodes receive the victory message at step 638 and terminate transmission at step 640 if they are transmitting in the data slot prior to the slot being bid upon. At step 644, the node with the highest bid transmits traffic in the data slot that was being bid on, and the method beginning at step 600 of FIG. 5A begins again for subsequent data slots in the light-trail.

It should be noted that particular embodiments may not include steps 636 and 638. In such embodiments, the fact that a node receives a negative acknowledgement may indicate to that node that it does not have the highest bid and thus it will not transmit in the slot that is being bid on and will stop transmitting if it is transmitting in the slot prior to the bid-upon slot. In these embodiments, the losing nodes would not require receipt of a victory message from the winning node to terminate transmission and to withhold transmission in the bid-upon slot.

It should also be noted that, in particular embodiments, although a node may lose a bid for a data slot in a light-trail, the conditions associated with that node (the criticality and/or the staticity) may require that a new light-trail be established so that the node may transmit its traffic. Thus, a losing node may, in particular embodiments, determine whether it needs a new light-trail. The discussion above regarding step 516 in FIG. 4 provides some examples of when a losing node may need to set up a new light-trail. There may also be other examples of when a losing node may establish a new light-trail. If needed, the losing node may establish a light-trail and may transmit traffic on the new light-trail. In particular embodiments, the node establishing the new light-trail may be the convener node in the new light-trail.

Once the example method returns to its beginning at step 600, the process is repeated for the next data slot in the light-trail. It should be noted that there may be more than one light-trail in the network, and that this example auction process could be implemented for any number of light-trails in the network. In addition, it should be understood that some of the steps illustrated in the flowchart of FIGS. 5A and 5B may be combined, modified, re-arranged, or deleted where appropriate, and additional steps may also be added to the flowchart. The steps may also be performed in any suitable order.

Although the present invention has been described with several embodiments, various changes and modifications may be suggested to one skilled in the art. It is intended that the present invention encompass such changes and modifications as fall within the scope of the appended claims.

The invention claimed is:

1. A method for allocating the use of an optical light-trail, the light-trail enabling a plurality of nodes included in the light-trail to share the use of an optical wavelength to transmit traffic between the nodes included in the light-trail, the method comprising: calculating a bid at a first node in the light-trail with consideration for the criticality of the node's need to transmit particular traffic on the light-trail; transmitting the calculated bid to one or more of the other nodes included in the light-trail; receiving an acknowledgment from one or more of the other nodes included in the light-trail, each acknowledgement indicating whether the transmitted bid is higher or lower than a bid calculated by the node from which the acknowledgment originates; and determining, based at least on the content of acknowledgements received, whether the transmitted bid is the highest bid; wherein receiving an acknowledgment from one or more of the other nodes comprises receiving a negative acknowledgment from any nodes having a calculated bid higher than the transmitted bid and receiving a positive acknowledgment from any nodes having a calculated bid lower than the transmitted bid.

2. The method of claim 1, further comprising, if the transmitted bid is the highest bid, communicating one or more control messages to the other nodes included in the light-trail indicating that the other nodes should terminate transmission.

3. The method of claim 2, further comprising transmitting data over the light-trail, wherein the light-trail is divided into a plurality of data slots and wherein data is transmitted for the data slot in the light-trail that was being bid on.

4. The method of claim 1, further comprising:
receiving, at the first node, a bid transmitted by a second node in the light-trail;
determining whether the bid received from the second node is higher than the bid of the first node; if the bid received from the second node is higher than the bid of the first node, communicating an acknowledgement to the second node indicating that the second node's bid is higher than the first node's bid; and passing the received bid to a third node in the light-trail.

5. The method of claim 1, further comprising: receiving, at the first node, a bid transmitted by a second node in the light-trail;
determining whether the bid received from the second node is higher than the bid of the first node; if the received bid is less than the bid of the first node, communicating an acknowledgement to the second node indicating that the second node's bid is less than the first node's bid; and squashing the received bid.

6. The method of claim 1, wherein the criticality of the node's need to transmit traffic on the light-trail comprises a latency of particular traffic to be transmitted from the node and the percentage of traffic buffered at a buffer of the node with respect to the total available memory in the buffer.

7. The method of claim 1, wherein the one or more of the other nodes included in the light-trail to which the calculated bid is transmitted comprise the node immediately downstream from the first node in the light-trail and the node immediately upstream from the first node in the light-trail.

8. The method of claim 1, wherein determining whether the transmitted bid is the highest bid comprises determining the type of acknowledgments received.

9. Logic for allocating the use of an optical light-trail, the light-trail enabling a plurality of nodes included in the light-trail to share the use of an optical wavelength to transmit traffic between the nodes included in the light-trail, the logic embodied in a non-transitory computer-readable medium and operable when executed to: calculate a bid at a first node in the light-trail with consideration for the criticality of the node's need to transmit particular traffic on the light-trail;

transmit the calculated bid to one or more of the other nodes included in the light-trail;

receive an acknowledgment from one or more of the other nodes included in the light-trail, each acknowledgement indicating whether the transmitted bid is higher or lower than a bid calculated by the node from which the acknowledgment originates; and determine, based at least on the content of acknowledgements received, whether the transmitted bid is the highest bid; wherein receiving an acknowledgment from one or more of the other nodes comprises receiving a negative acknowledgment from any nodes having a calculated bid higher than the transmitted bid and receiving a positive acknowledgment from any nodes having a calculated bid lower than the transmitted bid.

10. The logic of claim 9, further operable when executed to, if the transmitted bid is the highest bid, communicate one or more control messages to the other nodes included in the light-trail indicating that the other nodes should terminate transmission.

11. The logic of claim 10, further operable when executed to transmit data over the light-trail, wherein the light-trail is divided into a plurality of data slots and wherein data is transmitted for the data slot in the light-trail that was being bid on.

12. The logic of claim 9, further operable when executed to:
receive, at the first node, a bid transmitted by a second node in the light-trail;
determine whether the bid received from the second node is higher than the bid of the first node; if the bid received from the second node is higher than the bid of the first node, communicate an acknowledgement to the second node indicating that the second node's bid is higher than the first node's bid; and pass the received bid to a third node in the light-trail.

13. The logic of claim 9, further operable when executed to:
receive, at the first node, a bid transmitted by a second node in the light-trail;
determine whether the bid received from the second node is higher than the bid of the first node; if the received bid is less than the bid of the first node, communicate an acknowledgement to the second node indicating that the second node's bid is less than the first node's bid; and squash the received bid.

14. The logic of claim 9, wherein the criticality of the node's need to transmit traffic on the light-trail comprises a latency of particular traffic to be transmitted from the node and the percentage of traffic buffered at a buffer of the node with respect to the total available memory in the buffer.

15. The logic of claim 9, wherein the one or more of the other nodes included in the light-trail to which the calculated bid is transmitted comprise the node immediately downstream from the first node in the light-trail and the node immediately upstream from the first node in the light-trail.

16. The logic of claim 9, wherein determining whether the transmitted bid is the highest bid comprises determining the type of acknowledgments received.

17. A system for allocating the use of an optical light-trail, the light-trail enabling a plurality of nodes included in the light-trail to share the use of an optical wavelength to transmit traffic between the nodes included in the light-trail, the system comprising a first node in the light-trail operable to: calculate a bid with consideration for the criticality of the node's need to transmit particular traffic on the light-trail;

transmit the calculated bid to one or more of the other nodes included in the light-trail;

receive an acknowledgment from one or more of the other nodes included in the light-trail, each acknowledgement indicating whether the transmitted bid is higher or lower than a bid calculated by the node from which the acknowledgment originates; and determine, based at least on the content of acknowledgements received, whether the transmitted bid is the highest bid; wherein receiving an acknowledgment from one or more of the other nodes comprises receiving a negative acknowledgment from any nodes having a calculated bid higher than the transmitted bid and receiving a positive acknowledgment from any nodes having a calculated bid lower than the transmitted bid.

18. The system of claim 17, wherein the first node in the light-trail is further operable to, if the transmitted bid is the highest bid, communicate one or more control messages to the other nodes included in the light-trail indicating that the other nodes should terminate transmission.

19. The system of claim 18, wherein the first node in the light-trail is further operable to transmit data over the light-trail, wherein the light-trail is divided into a plurality of data slots and wherein data is transmitted for the data slot in the light-trail that was being bid on.

20. The system of claim 17, wherein the first node in the light-trail is further operable to: receive a bid transmitted by a second node in the light-trail;
determine whether the bid received from the second node is higher than its own calculated bid; if the bid received from the second node is higher than its own calculated bid, communicating an acknowledgement to the second node indicating that the second node's bid is higher than its own calculated bid; and passing the received bid to a third node in the light-trail.

21. The system of claim 17, wherein the first node in the light-trail is further operable to: receive a bid transmitted by a second node in the light-trail;
determine whether the bid received from the second node is higher than its own calculated bid; if the received bid is less than its own calculated bid, communicating an acknowledgement to the second node indicating that the second node's bid is less than its own calculated bid; and squashing the received bid.

22. The system of claim 17, wherein the criticality of the node's need to transmit traffic on the light-trail comprises a latency of particular traffic to be transmitted from the node and the percentage of traffic buffered at a buffer of the node with respect to the total available memory in the buffer.

23. The system of claim 17, wherein the one or more of the other nodes included in the light-trail to which the calculated bid is transmitted comprise the node immediately downstream from the first node in the light-trail and the node immediately upstream from the first node in the light-trail.

24. The system of claim 17, wherein determining whether the transmitted bid is the highest bid comprises determining the type of acknowledgments received.

* * * * *

UNITED STATES PATENT AND TRADEMARK OFFICE
CERTIFICATE OF CORRECTION

PATENT NO. : 7,801,034 B2  
APPLICATION NO. : 11/380812  
DATED : September 21, 2010  
INVENTOR(S) : Gumaste Page 1 of 1

It is certified that error appears in the above-identified patent and that said Letters Patent is hereby corrected as shown below:

In the Specification

Column 17, Line 18 after "In particular embodiments, an amount" delete "c" and insert -- $\varepsilon$ --.

Column 17, Line 19 after "This amount" delete "E" and insert -- $\varepsilon$ --.

Column 17, Line 31 after "$St_{ik}(t)$," delete "$m\text{bid}_{ik}$" and insert -- $m\text{bid}_k$ --.

Signed and Sealed this  
Twenty-sixth Day of November, 2013

Margaret A. Focarino  
*Commissioner for Patents of the United States Patent and Trademark Office*